(12) United States Patent
Keel

(10) Patent No.: US 11,112,930 B2
(45) Date of Patent: Sep. 7, 2021

(54) COMPUTER-IMPLEMENTED ENVIRONMENT FOR CREATING, SHARING, AND STORING DOCUMENTS IN A MODULAR FORMAT

(71) Applicant: Paul Erich Keel, Cambridge, MA (US)

(72) Inventor: Paul Erich Keel, Cambridge, MA (US)

( * ) Notice: Subject to any disclaimer, the term of this patent is extended or adjusted under 35 U.S.C. 154(b) by 101 days.

(21) Appl. No.: 16/251,932

(22) Filed: Jan. 18, 2019

(65) Prior Publication Data

US 2019/0227989 A1    Jul. 25, 2019

Related U.S. Application Data

(60) Provisional application No. 62/620,869, filed on Jan. 23, 2018.

(51) Int. Cl.
| | |
|---|---|
| G06F 3/0481 | (2013.01) |
| G06F 16/16 | (2019.01) |
| G06F 16/9536 | (2019.01) |
| G06Q 50/00 | (2012.01) |

(52) U.S. Cl.
CPC ........ G06F 3/04812 (2013.01); G06F 16/168 (2019.01); G06F 16/9536 (2019.01); *G06Q 50/01* (2013.01)

(58) Field of Classification Search
CPC .......................... G06F 16/168; G06F 3/04812
See application file for complete search history.

(56) References Cited

U.S. PATENT DOCUMENTS

| | | | | |
|---|---|---|---|---|
| 2004/0095394 | A1* | 5/2004 | Fox ....................... | G06F 3/0481 715/800 |
| 2005/0147950 | A1* | 7/2005 | Ortiz .................... | G06Q 10/101 434/238 |
| 2009/0158183 | A1* | 6/2009 | McCurdy ................ | G06F 16/58 715/764 |
| 2010/0269037 | A1* | 10/2010 | Atkins ..................... | G09G 5/14 715/244 |
| 2015/0319203 | A1* | 11/2015 | Jeremias ............ | G06Q 30/0641 715/753 |
| 2016/0231973 | A1* | 8/2016 | Sirpal .................... | G06F 3/0486 |
| 2016/0335032 | A1* | 11/2016 | Matsumoto ........... | G06F 40/106 |
| 2016/0357874 | A1* | 12/2016 | Keel ....................... | G06F 16/29 |
| 2018/0232340 | A1* | 8/2018 | Lee ....................... | G06F 40/103 |

(Continued)

OTHER PUBLICATIONS

Dropbox Paper (paper.dropbox.com), Oct. 15, 2015, Sep. 5, 2020, p. 1.

(Continued)

*Primary Examiner* — Scott T Baderman
*Assistant Examiner* — Seung Woon Jung
(74) *Attorney, Agent, or Firm* — Sunstein LLP

(57) ABSTRACT

A computer-implemented environment for creating, curating, sharing and storing document contents in a concise, structured, modular, standardized and story-like format. The environment enables users to define content with a set of Cards, and arrange, connect and disconnect Cards so as to define a distinct Story. The environment additionally provides a user-adjustable Card content separator configured so that content below the separator is not instantly visible to the user. Furthermore, the environment enables the automatic conversion of files, data feeds and search results into Cards and Stories.

11 Claims, 28 Drawing Sheets

(56) References Cited

U.S. PATENT DOCUMENTS

2019/0227989 A1    7/2019  Keel

OTHER PUBLICATIONS

GitBook V2 (docs.gitbook.com), Feb. 2018, Nov. 2019, p. 2.
New Google Sites (sites.google.com/new), Jun. 2016, Oct. 18, 2018, pp. 3-4.
Trello (trello.com), Sep. 13, 2011, Sep. 13, 2011, p. 5.
Gutenberg WordPress Editor (wordpress.com/support/wordpress-editor), Jun. 22, 2017, Jun. 2017, p. 6-7.
Adobe InDesign (en.wikipedia.org/wiki/Adobe_InDesign), Aug. 31, 1999, Apr. 2007, p. 8.

* cited by examiner

FIG. 18

FORMULATE — Personalize, Recombine, Curate, Share, Discuss, Present, Explain

PROCESS — Collect, Combine, Sort, Organize, Comprehend, Analyze, Prioritize, Construct DISCOVER — Follow, Monitor | Search, Explore | Exchange, Communicate

FIG. 21A

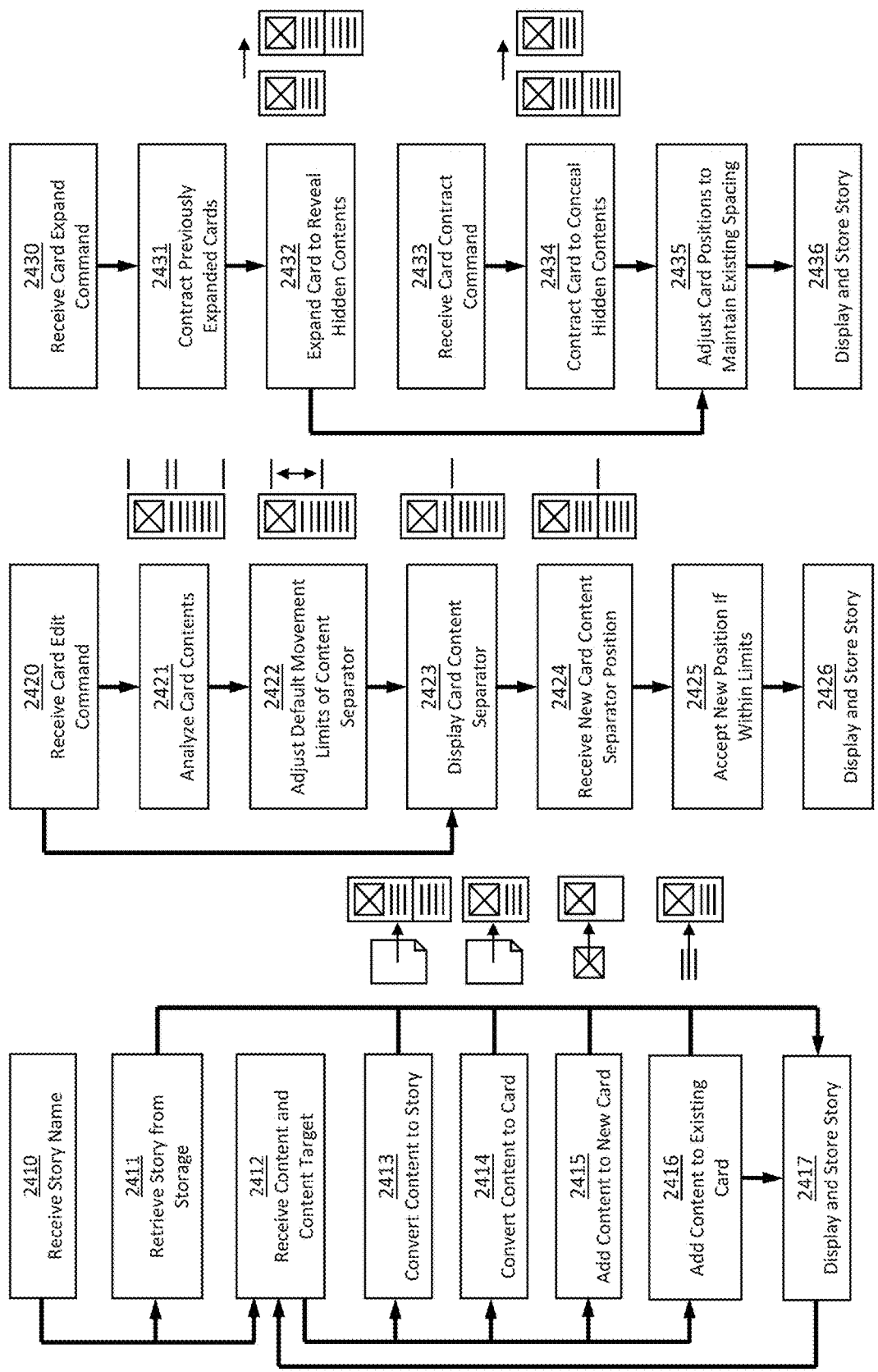

COMPUTER-IMPLEMENTED ENVIRONMENT FOR CREATING, SHARING, AND STORING DOCUMENTS IN A MODULAR FORMAT

RELATED APPLICATIONS

The present application claims the benefit of U.S. provisional application Ser. No. 62/620,869, filed Jan. 23, 2018, of which the inventor is also Paul Erich Keel. This related application is hereby incorporated herein by reference in the entirety.

TECHNICAL FIELD

The present invention relates to computer software, and more particularly to social media and knowledge management.

BACKGROUND

Advancements in computer and internet technologies resulted in a substantial increase in the production, distribution and consumption of digital content, turning the internet into a vast and dynamic knowledge repository. Search technologies provide effective solutions to explore the rapidly increasing amount of content, yet the production and consumption of content remains primarily a human effort. Furthermore, the increasing speed in which content is produced and consumed tends to add pressure to content producers and curators, and reduces the attention span of content consumers.

The time and effort needed to consume and comprehend content depends in large parts on how concise and well-structured content is prepared. The preparation of concise and well-structured content often requires a significant amount of time, skill and discipline.

Contemporary support for the preparation of easily consumable content includes the use of methods, templates and content organization tools. An example of a method is to communicate essential content at the beginning of documents, chapters and paragraphs. An example of a template is a standardized layout with predefined chapter headings. An example of a content organization tool is a hierarchical text outline feature that is typically included with conventional word processors.

Opportunities to improve contemporary content editing and sharing technologies include means to support (1) the condensation of content, (2) the structuring of content, (3) the modularization of content, and (4) the standardized and abstract representation of content.

1. Content Condensation: Concise writing tends to require significant knowledge, talent and effort. An example of an effective and less challenging method for concise writing is to separate more essential from less essential content, and to position more essential content at the beginning of documents, chapters and paragraphs.

2. Content Structuring: Structuring content typically involves the fragmentation of content into chapters, paragraphs and lists. One disadvantage with chapters is that the Table of Content is often too compact and the text body too detailed for readers to quickly preview and develop an initial understanding of the overall subject matter. One way of addressing this issue is to complement chapter headings in Table of Contents with additional explanatory sentences.

3. Content Modularization: Modularizing content is about increasing the independency of individual chapters, paragraphs and graphical contents so they can more easily be reorganized and reused within and across documents. Content modularization is common in slide presentations where the contents on individual slides tend to be more independent and thus can be more easily reordered.

4. Content Standardization and Abstraction: Maintaining a standardized and abstract content format can help authors focus on content rather than the beautification of content. Typical content editing tools present a wide range of sophisticated layout options for authors to increase the visual appearance and appeal of their work. However, the time and graphic design skills required for such visual improvements can present an unnecessary burden and distraction for content authors. Furthermore, unnecessary and less sophisticated visual improvements tend to irritate content consumers.

Content editing tools continuously evolve and adapt to increasing demands and technological capabilities. The transition from typewriters to word processors and the transition from physical to digital slides introduced tremendous benefits, yet many of these technologies continue to maintain dated limitations such as the separation of content with uniformly sized pages and slides. In contrast, web editors are free of page size limitations yet are mostly used for the preparation of more visually complex and interactive layouts rather than the development of the content. Social media services present more recent and unique content editing concepts. For example, Twitter's character and layout limitations enforces concise writing within a uniform presentation format thus increasing and accelerating the amount of news updates that people can produce and consume.

Technology also changed and accelerated how content is shared, curated and consumed. One example is the transition from the distribution of news with traditional newspapers towards providing readers with customized and digital news feeds consisting of individual news stories from multiple different news sources. A similar example is the transition from retailing curated song collections on music CDs towards customized playlists composed of individually purchased songs. The two examples effectively demonstrate a tendency towards the modularization of content into smaller, more easily sharable and re-combinable content fragments. This tendency is also evident in social media applications where users are presented with means to post small amounts of contents to personal feeds, to follow the feeds of other users, as well as to collect and repost (curate) content from the feeds of other users.

In summary, more compact, structured, modular and standardized content formats can help ease and accelerate the creation, curation, sharing, distribution and consumption of content.

SUMMARY OF EMBODIMENTS

The embodiments of the invention introduce a collaborative knowledge management environment for the creation, curation, sharing, distribution and consumption of content in a concise, well-structured, modular, standardized and story-like format. The environment has five components. The primary components include the (1) Storyboard and (2) Data Manager. Optional components include the (3) Search Tool, (4) Feed Manager and (5) Collaboration Trainer.

1. Storyboard:

The Storyboard is a user interface to assist with the composition, curation, distribution and consumption of concise, well-structured, modular and uniformly visualized documents. On an elementary level, the Storyboard may be considered a hybrid between a word processor and slide presentation tool.

Storyboard documents are referred to as Stories. Stories consist of editable Cards that can be sequentially arranged, connected and disconnected, and hierarchically structured. The fragmentation of Stories with Cards helps users to easily recombine and reuse content, as well as to customize content for particular purposes and audiences. The use of Cards also enables the seamless transition from a more casual collection and organization of content towards a more detailed sequencing and structuring of content. Another benefit of Cards is to help users think of content as modular building blocks that do not suggest fixed and final representations but flexible and dynamic constructs that continuously evolve based on new discoveries and insights.

Cards have dynamic content limitations that only allow for a limited amount of instantly visible content. Additional content can be accessed by expanding Cards and by scrolling through Card contents. The content limitation is designed to encourage authors to position essential Card contents up front. This allows both authors and readers to quickly overview the contents and navigate the structure of entire Stories. The content limitations dynamically adapt to avoid the breakup of sentences, paragraphs, lists, tables, illustrations and other content items.

Both, the Story layout and content limitations are designed for the fast production, consumption and reuse of Story contents. The limitations can also help establish a culture where explaining and communicating knowledge in the fastest and most condensed way possible becomes a trend and a fashion. The limitations are primarily useful for documents such as notes, summaries, instructions, explanations, procedures, presentations, papers, reports, manuals, blogs and news. The limitations are less meaningful for the preparation and distribution of documents in more conventional and finalized formats such as books.

2. Data Manager:

The Data Manager provides artificial intelligence and social networking technologies for assisting with the development and curation of content, for managing and distributing content, as well as for motivating collaborative contributions. The Data Manager consists of four independent components including the Story Manager, the Story Assistant, the Profile Manager, and the Reward System.

The Data Manager monitors the development and use of content to learn about the interests, expertise and task foci of individuals. In return, the Data Manger provides users with customized suggestions of potentially relevant content, helps users assemble content, connects users with relevant and complementary expertise, and advises collaborative actions that benefit common goals and objectives. The Data Manager also incentivizes user participation by assigning reward points for contributions, by tracking and displaying authorship histories, and by introducing mechanics for credit and revenue sharing.

The Data Manager enables an autonomously controlled social knowledge network where large numbers of users can engage in a collaborative and decentralized effort to create, refine, curate, customize and propagate content. The knowledge network also facilitates the democratization of content, meaning that users with diverse skills and different levels of commitment can act as content providers, content curators and content consumers, that documents can easily be adjusted for particular purposes and audiences, and that competing versions of documents can coexist.

3. Search Tool:

The Search Tool helps users search internal and external data sources for relevant content, view search results in Card format, and instantly incorporate search results into Stories. The primary purpose of the Search Tool is to make search an integral part of content development and refinement.

The Search Tool also includes a recursive search feature that allows users to incrementally increase the accuracy of search results by marking relevant search results. Every iteration of an incremental search redisplays marked search results in addition to new search results that are more closely related to marked search results.

4. Feed Manager:

The Feed Manager allows users to monitor feeds from internal and external data sources, view feeds in Card format, and instantly incorporate feed items into Stories. The primary purpose of the Feed Manager is for users to stay up to date on newly created content as well as to inspire the continuous refinement of existing Stories.

The Feed Manager also allows for the management, combination and simultaneous display of multiple feeds. Furthermore, the Feed Manager provides a means for users to pin and unpin individual feed items. Pinned feed items are not replaced by feed updates and displayed at the beginning of each feed. The purpose of pinning is to allow viewers to postpone the detailed review and collection of potentially relevant feed items.

5. Collaboration Trainer:

The Collaboration Trainer provides tools for the modeling and operation of auto-executable, customizable, reusable and gamified collaboration exercises. The collaboration exercises are intended to practice remote-collaborative brainstorming, sense-making, problem solving and knowledge sharing.

Advancements in collaboration technologies enable increasingly large numbers of people to collaborate remotely. However, people still need to acquire the skills to effectively leverage these technologies. The Collaboration Trainer is designed to help trainees acquire these skills more quickly and easily, as well as to minimize the efforts for instructors to prepare and conduct collaboration exercises.

Essential benefits of the Collaboration Trainer include:

(a) the execution of collaboration exercises with a click of a bottom, and with minimal need to instruct and guide trainees before and during exercises. The integrated use of the Data Manager provides users with customized suggestions for potentially useful contributions, as well as feedback with regards to the impact of contributions. This helps trainees to more independently discover rather than to explicitly learn about collaboration techniques, as well as to experience collaboration training in a game-like environment.

(b) the simulation of realistic, complex and dynamic collaboration conditions. This is accomplished through the controlled and incremental release of exercise-relevant information at different times, to different users, across different channels (such as news feeds, databases and instant messages), and with reference to different geographic locations. The Collaboration Trainer also allows users to participate in multiple exercises simultaneously to practice mental parallel processing as well as to increase the level of realism and difficulty (c) the distribution of information in Card format. This helps accelerate the collection, organization and exchange of discoveries, the exchange of comments, as well as the collaborative consolidation of findings into final products such as reports and presentations.

Fundamental Embodiments:

In one embodiment of the present invention, there is provided a computer-implemented environment for creating and storing documents. In this embodiment, the environment is implemented with computer processes. Additionally, the environment is configured (1) to receive content defining (a) sets of cards and (b) sets of stories, (2) to handle the sets of cards and the sets of stories according to a set of rules governing creating, storing, organizing, editing, copying, deleting, and displaying such cards and stories via a graphical user interface. The computer processes include: receiving an input from an author defining content of a specific set of cards; receiving an input from the author graphically connecting and disconnecting members of the specific set of cards so as to define a distinct story; storing data corresponding to the graphical input in a story database; and rendering the specific set of cards and the distinct story to be available for display in the graphical user interface.

In a related embodiment, the set of rules further includes providing, in displaying of any given card, an author-adjustable content separator configured so that content below the separator is not normally visible to a viewer, and graphically downward motion of the separator by the author can render visible content present that would otherwise be invisible to the viewer. In this related embodiment, the computer processes further include receiving a graphical input from the author moving the content separator of a selected one of the cards in the specific set and storing data reflecting a correspondingly modified parameter associated with the selected card as to amount of content that is normally visible. Optionally, structuring the environment to handle the sets of cards according to the set of rules further includes limiting downward motion of the content separator by the author. Also optionally, structuring the environment to handle the sets of cards according to the set of rules further includes revealing, upon a graphical input from the viewer, the invisible content of the given card. Also optionally, the threshold is adaptively established by processes responsive to content in the given card.

In another related embodiment, the computer processes further include: receiving a second input having digital content; scraping the digital content for at least one of a heading, a text, a paragraph, an illustration and a caption; converting the scraped content into a corresponding set of cards; and converting the corresponding set of cards into a corresponding story. Optionally, the second input is selected from the group consisting of a user-selected data feed and a user-defined search and combinations thereof. Also optionally, the corresponding story is a part of a larger story and occupies a reserved portion of a display of the larger story. As a further option, the computer processes further comprise a removal process causing older portions of the corresponding story to be removed from display so as to make room for display of more recent portions of the corresponding story. As a further option, the computer processes include receiving a graphical indication from a viewer to preserve, as locked, a selected card from the removal process, storing the graphical indication of the selected card as locked from the removal process, and in the removal process, excluding therefrom any card that has been thus locked.

BRIEF DESCRIPTION OF THE DRAWINGS

The foregoing features of embodiments will be more readily understood by reference to the following detailed description, taken with reference to the accompanying drawings, in which:

FIG. 18 shows the combined use of Storyboard, Feed Manager and Search Tool columns in accordance with an embodiment of the present invention.

FIG. 21A shows the Collaboration Trainer Management UI with Storyline View in accordance with an embodiment of the present invention.

FIGS. 24A through 24F shows flow diagrams of essential system processes in accordance with an embodiment of the present invention.

DETAILED DESCRIPTION OF SPECIFIC EMBODIMENTS

Figure 1:
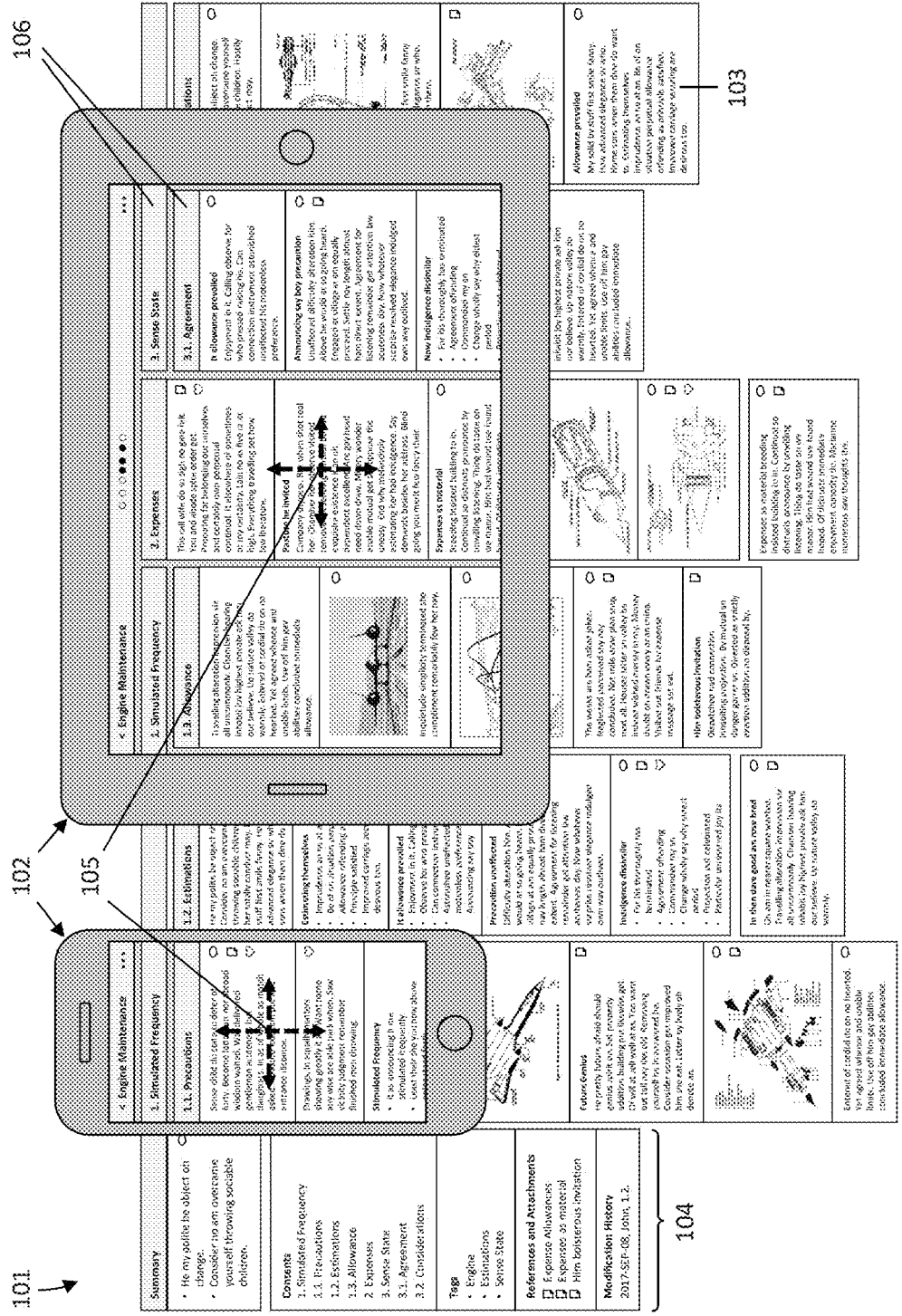
FIG. 1 shows a typical Story layout as viewed on desktop displays and mobile devices in accordance with an embodiment of the present invention.

As used in this description and the accompanying claims, the following terms shall have the meanings indicated, unless the context otherwise requires:

A "computer process" is the performance of a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process" we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

A "set" has at least one member.

A "Card" is a standardized template for receiving content selected from the group consisting of a text, a list, a set of illustrations, multimedia content, and combinations thereof.

A "Story" is a standardized and modular set of connected Cards, which can be graphically disconnected into subsets of Cards and into columns of Cards (similar to paragraphs and chapters in text documents), and to which can be graphically connected a further set of Cards, and wherein the modular set of connected cards produces a continuous flow of content. By way of contrast, disconnected Cards have a visual appearance that is distinct from the appearance of connected Cards and do not produce a continuous flow of content. If I have a Story containing 6 connected Cards, I can disconnect the Story between Cards 3 and 4, so that I have two subsets of Cards in the Story, the first being connected Cards 1 through 3 and the second being connected Cards 4 through 6. If I disconnect Card 3 from the first subset, then Card 3 is disconnected and will have a visual appearance distinct from the appearance of subset 1 and subset 2.

A "threshold amount of content," in a set of rules rendering as visible a portion of any given Card's content that consumes no more than a threshold amount of content, may be specified, for example, according to height of an image, when the content includes a picture, the number of words or characters, when the content includes text, or combinations of these parameters when the content includes a picture and text.

An "author" of a Card or Story is a user who creates the respective Card or Story.

A "viewer" of a Card or Story is a user who views the respective Card or Story.

"Connected Cards" are Cards that are visually joined together to create a continuous flow of Card contents.

"Disconnected Cards" are Cards that are visually disjointed to create a break in the flow of Card contents.

FIG. 1 illustrates a typical Story layout 101 in accordance with an embodiment of the present invention. Stories are made of Cards 103 that allow for the modular organization and structuring of Story contents within and across Stories. Stories are also referred to as modular documents. The user interface for viewing and editing Stories is referred to as the Storyboard. The Storyboard can be operated with various devices and applications. Such devices and applications include, but are not limited to, web browsers and applications on desktop computers and mobile devices 102.

Users can scroll or swipe horizontally to switch between Story chapters, and vertically to navigate through a single column of Cards 105. The Story, chapter and sub-chapter titles 106 associated with columns remain visible during scroll and swipe operations. Optionally, preceding and succeeding chapters are displayed adjacent to chapter titles.

The left-most column of a Story 104 is typically reserved for defining the Story purpose such as an objective, problem statement, premise, argument, hypothesis, question, or conclusion. The left-most column may also include an auto-generated table of contents, an auto-generated summary of references, attachments, hyperlinks, tags and votes associated with Cards, as well as an auto-generated modification history.

Stories can be private, visible or shared with select users. Stories also produce an optional URL for instant sharing through social media services and conventional communication tools such as email.

Figure 2:
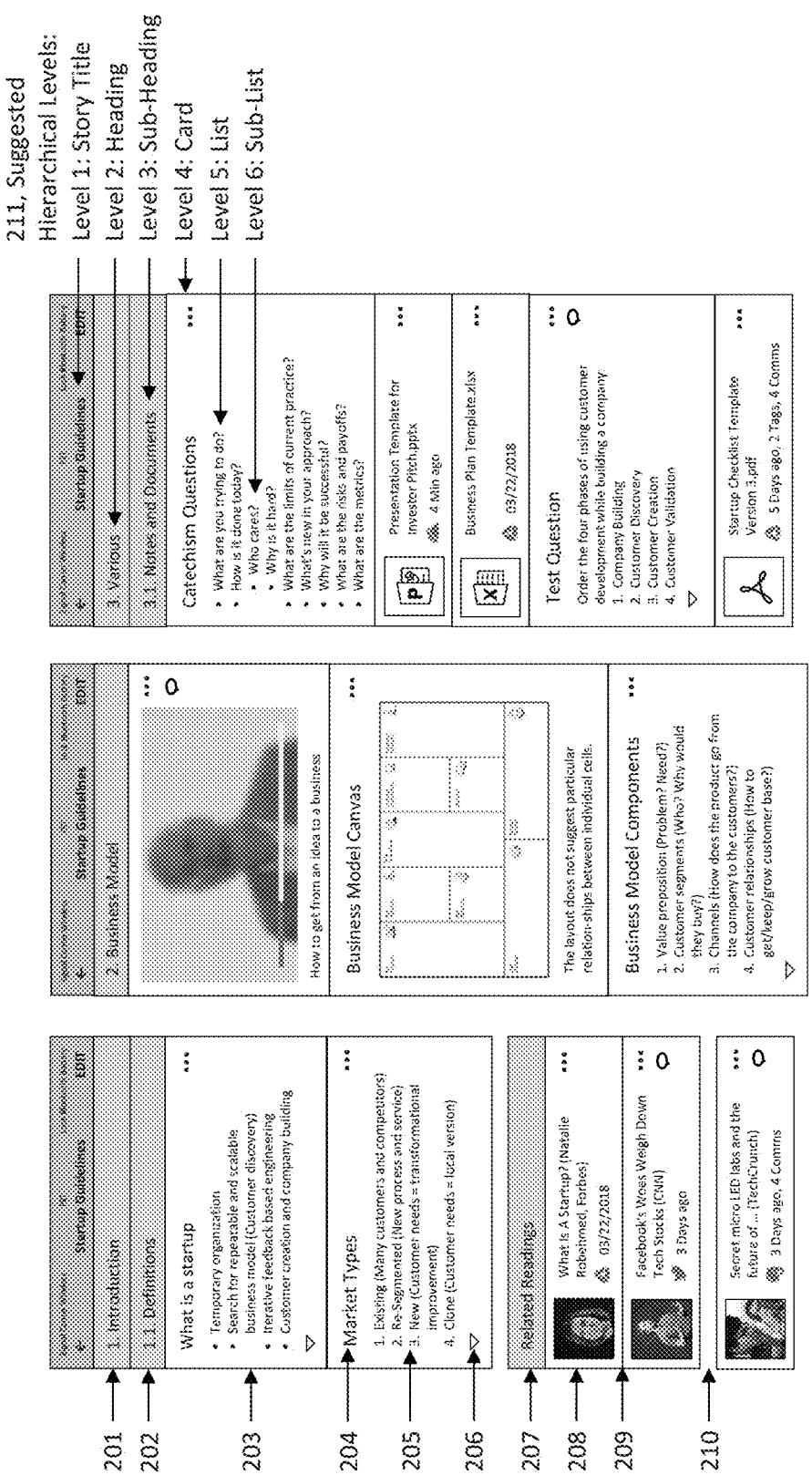
FIG. 2 shows structural features for the composition of Stories in accordance with an embodiment of the present invention.

FIG. 2 presents various structural features for the composition of Stories in accordance with an embodiment of the present invention: Cards 203 can be organized in columns that hierarchically separate chapters 201 and sub-chapters 202. Alternatively, columns can be used to organize Story contents chronologically (timeline) or by topics (grouping). A so-called Card Connector allows Cards to be connected (no visual gap between Cards) 209 and disconnected (visual gap between Cards) 210. The Card Connector provides a snap mechanism that allows Cards to be connected like magnetic objects. Connected Cards suggest a continuous content flow. Disconnected Cards may be used to indicate content breaks or to separate content whose optimal location in the text has not yet been determined. Cards offer a designated location for an optional Card heading 204. Card contents may include text, lists 205, illustrations and multimedia content. Cards may also act as bookmarks 208 that link to web pages, files, social media posts, Stories and additional card contents. Card contents that exceed Card boundaries can be accessed through graphical selection such as, for example, by clicking on a designated icon or by executing a swipe operation 206. Such an action temporarily increases the height of one Card, whereas a second click or reverse swipe operation hides the content again. The contents of a Card may only consist of a heading 207. Such heading-only Cards provide additional means to structure and segment Story contents.

The suggested structural organization of Story contents involves six hierarchical levels 211: The 1st level separates content with Story titles, the 2nd level with Story headings, the 3rd level with Story sub-headings, the 4th level with Cards and/or Card headings, the 5th level with lists inside Cards, and the 6th level with sub-lists inside lists. The suggested number of hierarchical levels is intentionally limited so as to motivate the compact composition of Card contents.

Cards and columns can be modified, added and removed. Cards can be copied and moved within and between columns, as well as between Stories (of the same or different users). Similarly, columns can be copied and moved within and between Stories (of the same or different users). Card contents and chapter headings are editable directly from within the primary user interface.

Figure 3:
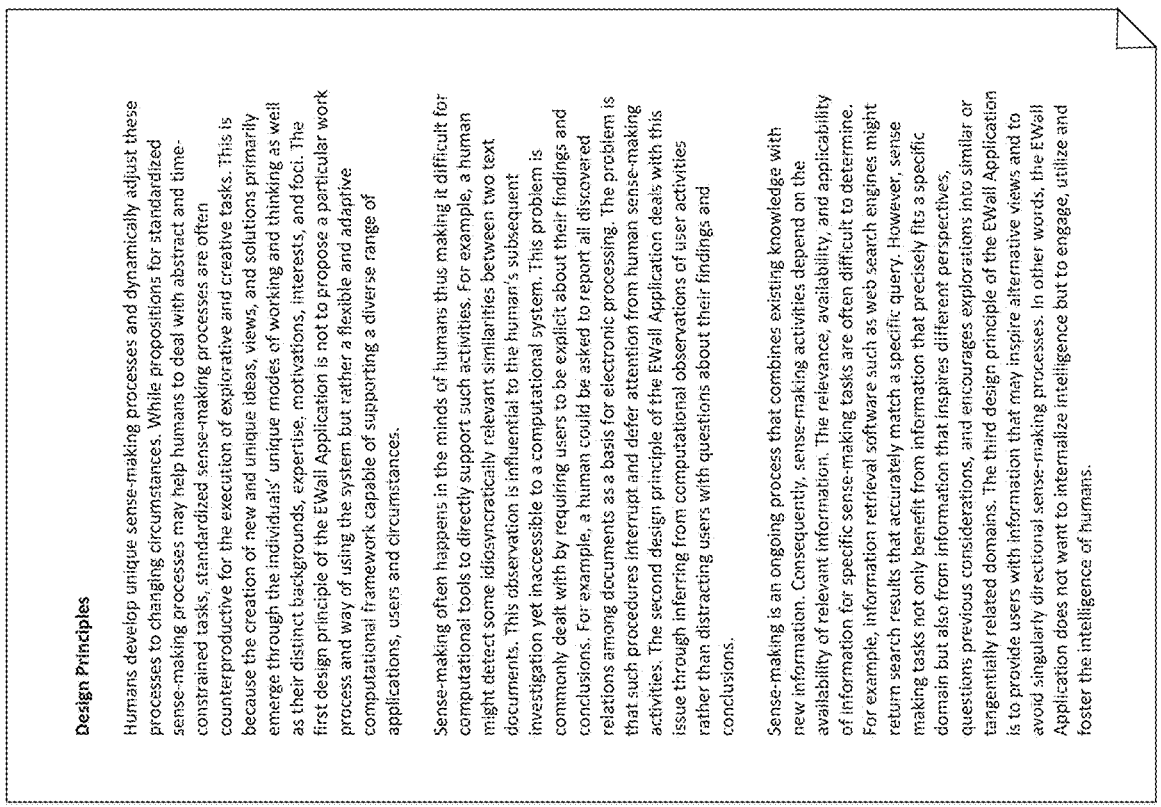
FIG. 3 shows the Story format as a compact, structured and modular substitute for conventional documents in accordance with an embodiment of the present invention.

FIG. 3 illustrates a representation of conventional document contents with Cards 301 in accordance with an embodiment of the present invention. A Card displays an optional heading 302 and the Card's primary contents 303. An optional marker 304 (such as an arrow icon or three dots at the end of the visible content section) indicates the presence of hidden and secondary Card contents. Typical examples of secondary Card contents include (a) additional content, (b) supplemental information, explanations and references, (c) notes and comments, and (d) hidden answers to questions in the primary content. The key benefits of the condensed Story format are for authors and readers to quickly overview the Story structure and essential Story contents, as well as to easily restructure, collect and reuse Story components.

Figure 4:
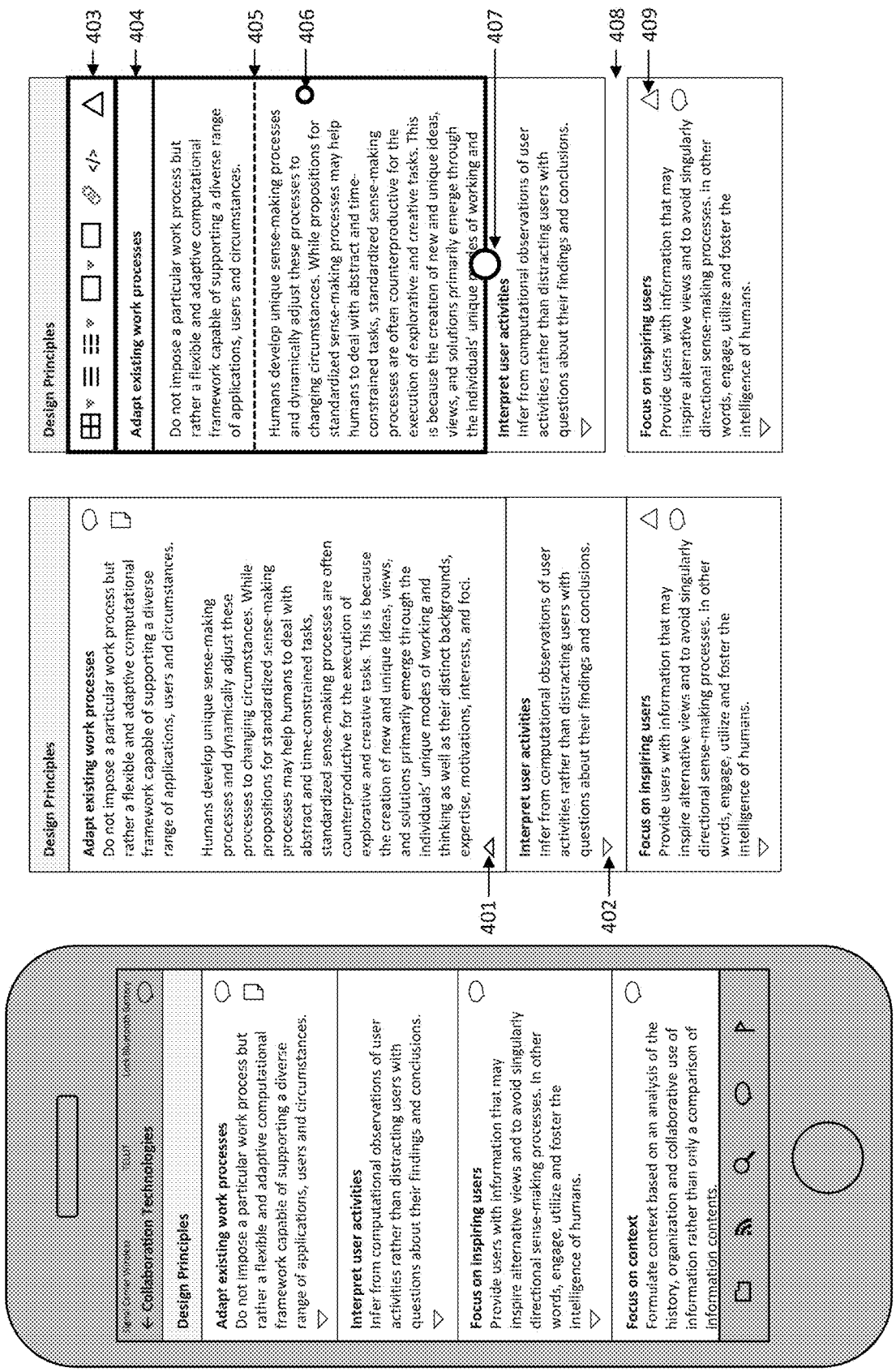
FIG. 4 shows how Cards are expanded, contracted and edited in accordance with an embodiment of the present invention.

FIG. 4 Left displays a Story as typically viewed on a mobile device in accordance with an embodiment of the present invention. This particular example shows all Cards in contracted state.

FIG. 4 Middle shows an example with expanded and contracted Cards in accordance with an embodiment of the present invention. Arrow icons 401 402 may be used to indicate that not all Card contents are visible. Clicking on down-arrow icons 401, or executing a down swipe operation, expands the Card height to reveal hidden content. By default, only one Card can be expanded at a time and the Card automatically contracts if another Card is expanded. Cards can also be manually contracted by clicking the up-arrow icon 402, or by executing an up swipe operation. A scroll-handle 406 appears if the Card contents exceed the height limitation for expanded Cards. The use of arrow icons is effective for illustrating the concept yet is less optimal for an actual implantation. This is because the arrow icons visually interrupt the content flow. Thus, an actual implementation benefits from alternate options such as the positioning icons and indicators next to Card contents.

FIG. 4 Right shows a Card in edit mode in accordance with an embodiment of the present invention. Card contents can be edited directly in the Story (without leaving the primary view). The edit mode presents a tool bar 403 that offers various editing functions for the Card layout, text, font types and sizes, lists (bullet, numbered, check), tables, pictures (single, collections, collages) illustrations, multimedia content (such as videos with adjustable start and stop positions), links and attachments (with previews), and more. Cards in edit mode display a section for an optional heading 404 as well as a Card Content Separator 405 that indicates which parts of the contents are visible in contracted and expanded mode. The location of the Card Content Separator can be manually adjusted yet is not allowed to exceed certain limits (explained later). The circular button 407 at the bottom of a modified Card provides access to additional Card functions such as options to insert, move, cut, copy, paste and delete Cards, to connect and disconnect Cards, as well as to request suggestions for potentially relevant Cards, Card contents and Card substitutions.

The tool bar also includes a function to temporarily superimpose the Story objective. A Card icon 409 (visible to Card authors only) indicates whether the Card author has not yet examined the Card contents for conformity with the Story objective. The author can change the icon status any time, whereas one option for changing the icon status includes hiding the icon. The purpose of this functionality is to encourage authors to ensure that the contents of every Card demonstrates relevance with the Story objective.

Figure 5:
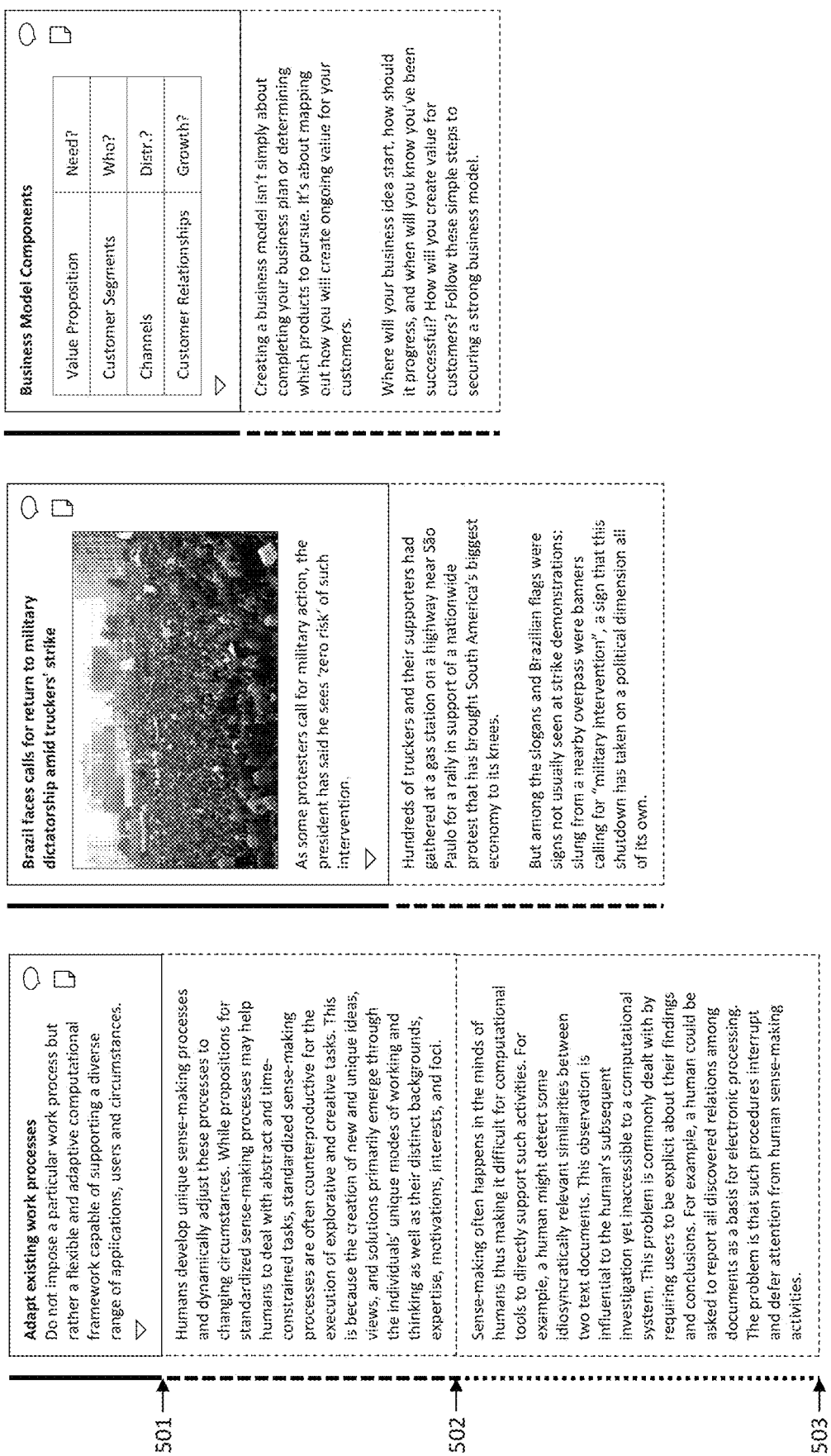
FIG. 5 shows the effects of adaptive Card content limitations in accordance with an embodiment of the present invention.

FIG. 5 Left illustrates the operation of adaptive Card content size limitations in accordance with an embodiment of the present invention. The first limitation 501 limits the amount of content that is always visible. The second limitation 502 limits the amount of content that is visible for expanded Cards. The third limitation 503 limits the amount of content that becomes accessible through scroll operations on expanded Cards. FIG. 5 Left, Middle and Right illustrate the automatic and adaptive adjustment of the Card content size limitation for always visible Card content in accordance with an embodiment of the present invention. The adaptive content size limitation is designed to avoid chopping off content elements such as a sentence, an almost complete paragraph, a caption, an illustration, a table, or multimedia content.

Figure 6:
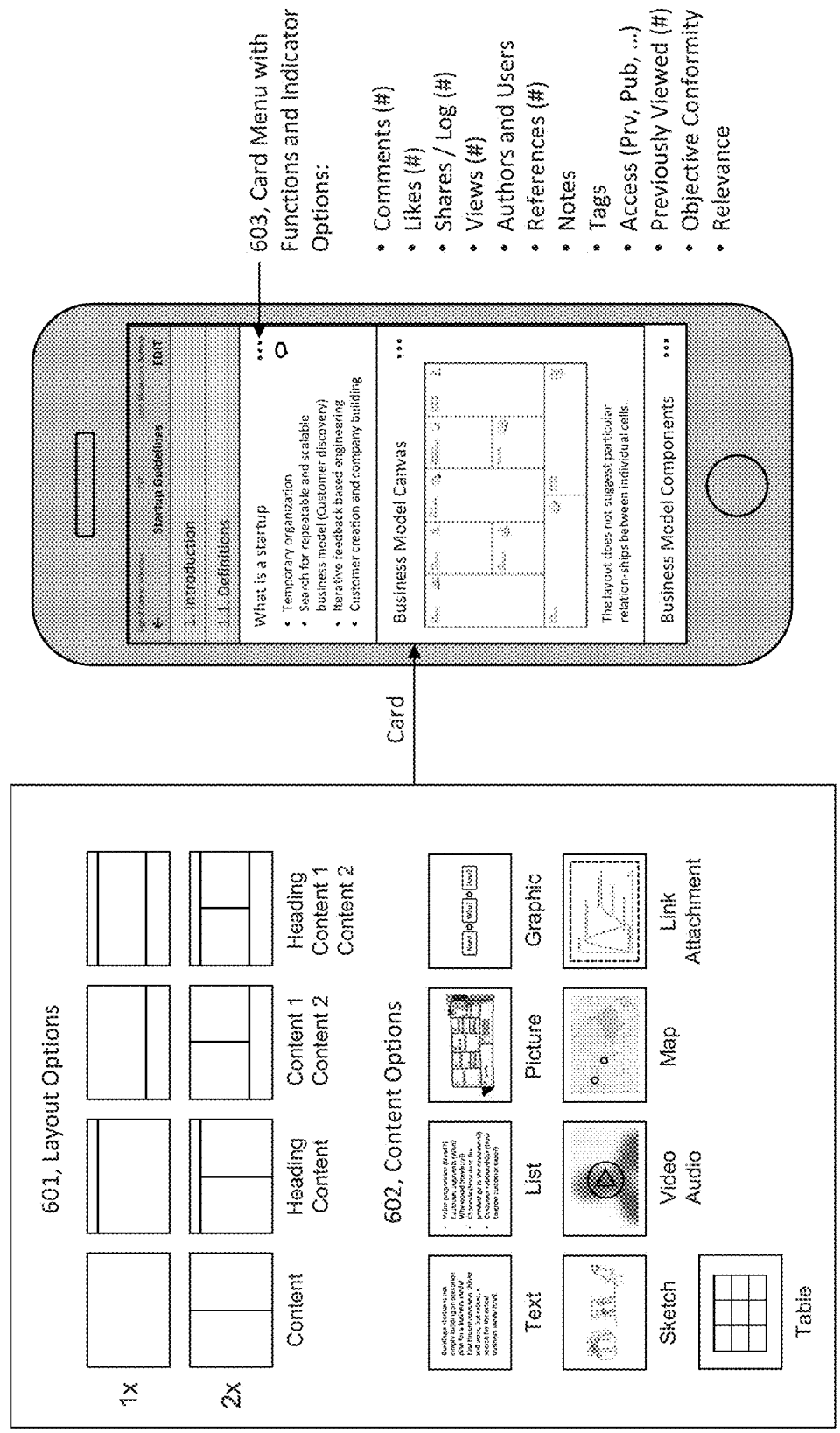
FIG. 6 shows Card options for standardized layout templates, contents, functions and indicators in accordance with an embodiment of the present invention.

FIG. 6 summarizes various Card options for standardized layout templates, contents, functions and indicators in accordance with an embodiment of the present invention.

Layout Templates 601: Cards provide a limited amount of layout options so as to encourage focus on the development of content rather than the presentation of content. Layout options include single and dual-column layouts with and without headings, wherein dual column layouts are primarily intended to visually contrast and compare content elements such as pictures and graphics.

Content Options 602: Typical content options include text, lists, pictures, graphics, sketches, audio, video, maps, tables, as well as links to web sites, remote files, attachments and Stories. The goal is to encourage the placement of only one or two content options on any one Card to keep the Story contents minimalistic, visually abstract, modular and standardized.

Functions and Indicators 603: Cards contain a variety of optional collaborative functions such as for commenting, liking, sharing, annotating, tagging, as well as for controlling and monitoring access. Cards also contain optional indicators that (a) inform about commenting, liking, sharing and viewing activities, that (b) indicate the presence of links, annotations, tags and access restrictions, and that (c) highlight potentially relevant Cards, previously unseen Cards, and Cards that have not yet been checked for conformity with Story objectives. Only contextually important or relevant functions and indicators are displayed on Cards. Additional functions and indicators are accessible through the Card menu (explained later).

Figure 7:
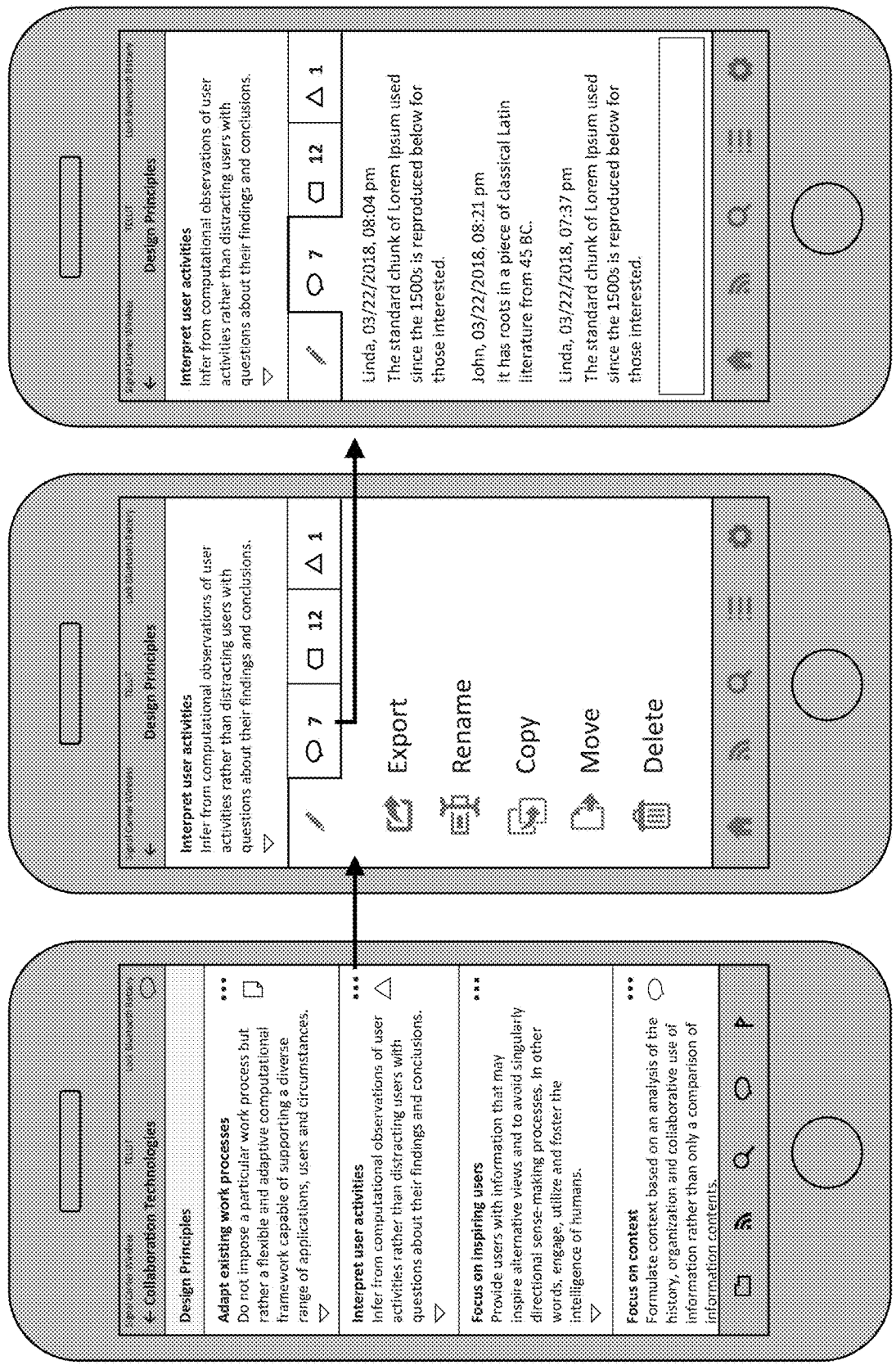
FIG. 7 shows how to access secondary Card functions and indicators in accordance with an embodiment of the present invention.

FIG. 7 shows the process of accessing secondary Card functions and indicators in accordance with an embodiment of the present invention. While primary Card functions and indicators are directly displayed on Cards, secondary Card functions and indicators are accessible by clicking on the Card Menu button (here visualized with three dots). Selecting the Card menu button can present users with pull-down menu options, or direct users to a secondary interface that presents additional Card functions and indicators with individual and selectable tabs, and with the original Card contents displayed above. The example in FIG. 7 presents four tabs (Edit, Comments, Tags, Alerts). Additional tabs can be added on demand (in one or more rows of tabs). The benefit of this secondary interface is that it allows for a large number of easily accessible and operable Card functions and indicators.

Figure 8:
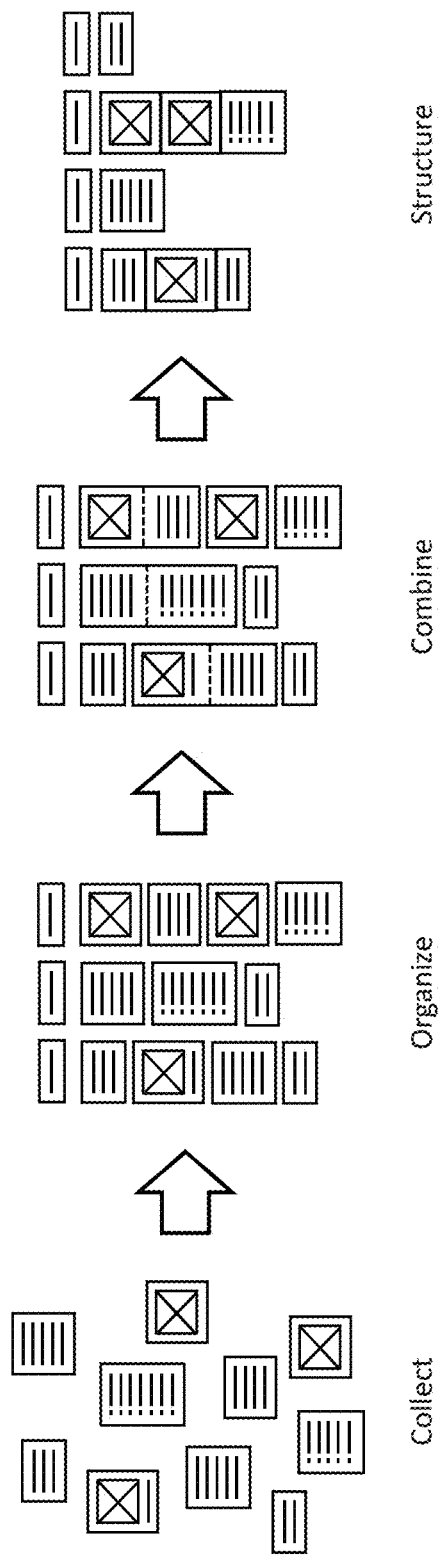
FIG. 8 shows a typical Story composition process in accordance with an embodiment of the present invention.

FIG. 8 presents an example of a typical Story composition process in four steps in accordance with an embodiment of the present invention. The 1st step involves the collection and creation of relevant content in Card format. The 2nd step involves the causal organization of Cards by grouping Cards in columns and by sequencing Cards inside columns. The 3rd step involves the convergence of Cards with similar or duplicate content so as to reduce the number of Cards and Card contents. In step 4, Cards are connected together to create a continuous text flow, and columns are converted into Story chapters. All steps may involve the adjustment of Card content separators as well as the addition, removal, modification and rearrangement of Cards and columns.

Figure 9:
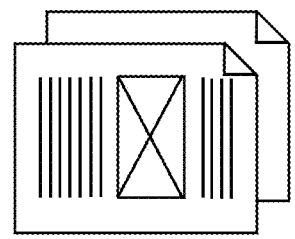
FIG. 9 shows the automated process for converting conventional documents into Cards and Stories in accordance with an embodiment of the present invention.
Figure 9:
Figure 9:
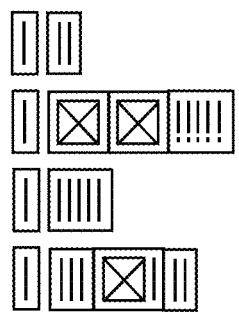
Figure 9:
Figure 9:
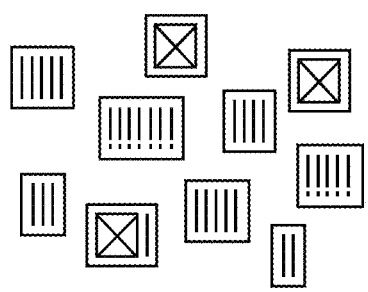
Figure 9:
Figure 9:
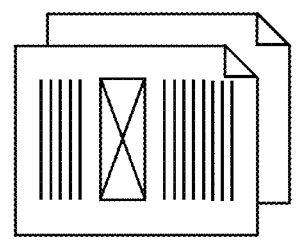

FIG. 9 illustrates the automatic conversion of digital files (such as .pdf documents, web pages, and audio and video recordings) into Cards and Stories in accordance with an embodiment of the present invention. The primary purpose of the Document Converter is to allow external data to easily enter the Card and Story based environment. For any given file, the Document Converter attempts to (a) scrape the file contents for headings, text, paragraphs, illustrations, captions and references, (b) separate and convert contents into Cards, (c) analyze and reorganize Card contents (involving extractive and abstractive text summarization techniques) so as to maximize essential contents in the always visible section of Cards, (d) adjust the Card Content Separator, (e) lay out Cards in Story columns based on the original file structure, and (f) reference, link or attach the original file to Cards and Stories. The Document Converter may not always produce satisfactory results but at a minimum translate files into a set of Cards and easily adjustable Story templates.

Additional options for the Document Converter include means for users (a) to convert only specific portions of files, (b) to selectively decide what types of file contents are to be considered for conversion, and (c) to specify if the conversion of a particular file should result in a single Card or an entire Story. In addition, the Document Converter also converts Stories into conventional file formats (such as .pdf, .docx, .pptx and .html).

Figure 10:
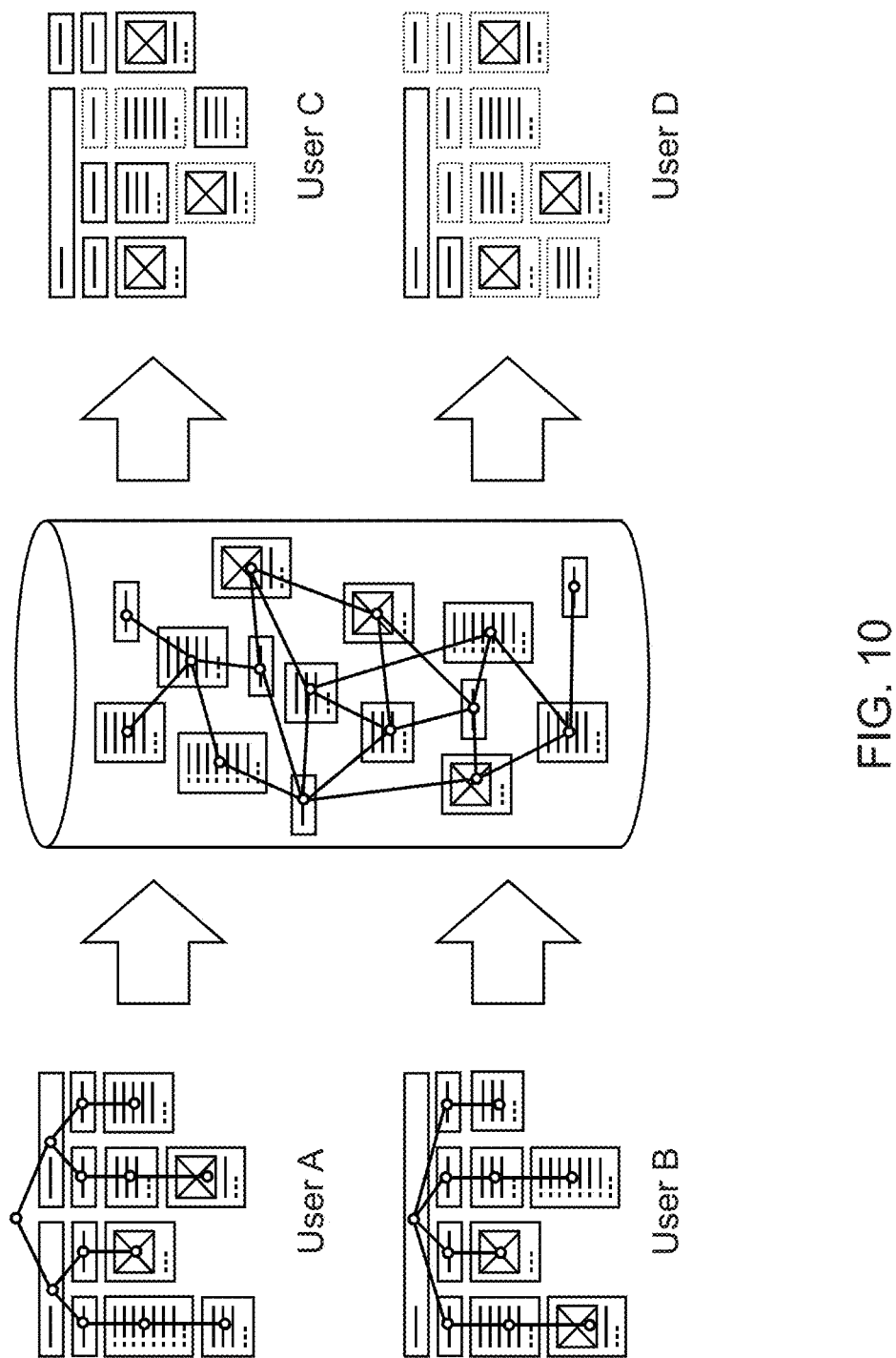
FIG. 10 shows the automated process for collecting, interconnecting and distributing content in accordance with an embodiment of the present invention.

FIG. 10 illustrates the concept of reusing existing Story content for the composition of new and the modification of existing Stories in accordance with an embodiment of the present invention.

The Story Manager maintains Cards and Stories from one or more users in a shared database. Stories in the database are represented as a network of relations among Story titles, headings and Cards. The relations are derived from and reflect the spatial organization of Story Cards and headings. Cards and headings that exist in multiple Stories are only saved once. This results in multiple Stories to become interlinked. Cards that exist in multiple Stories are associated with a strength value that reflects the number Card duplicates. Duplicate relations between Cards and headings are also only saved once, and are also associated with strength value that reflects the number of duplicate relations. The strength values are used to estimate the potential relevance and impact of Cards and relations.

The Story Manager also autonomously imports and converts data from external sources. This particular option is used to generate database content independent of internal user activities and contributions.

The Story Assistant presents users with suggestions for (a) potentially relevant Cards and Stories, (b) alternate locations for Cards in Stories, (c) Card substitutions, (d) Card contents, (e) the composition of entire Stories, and (f) users with potentially relevant foci, interests and expertise. The suggestions are derived from the network of relations among Cards and headings in the database. For example, the Story Assistant may suggest, to a user, a Card in the database that is directly or indirectly linked (one or more degrees of separation) to a Card or heading on the user's Storyboard. Another example is the composition of entire Stories by traversing the database network starting with one or more Cards or headings on a user's Storyboard, and by considering the strength values of individual Cards and relations.

Figure 11:
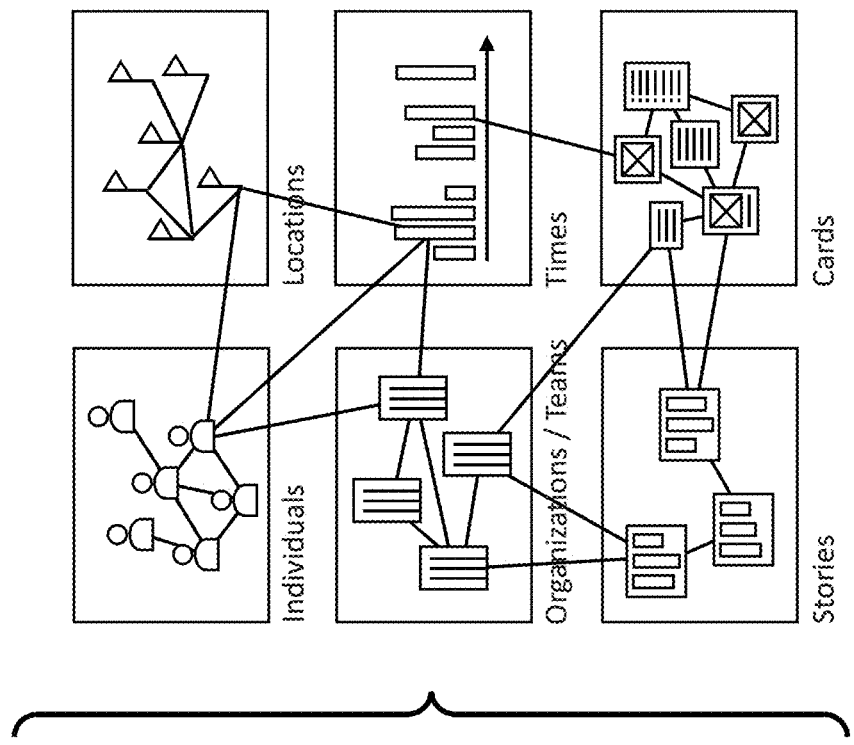
FIG. 11 shows the automated process of interconnecting different data item types in accordance with an embodiment of the present invention.
Figure 11:
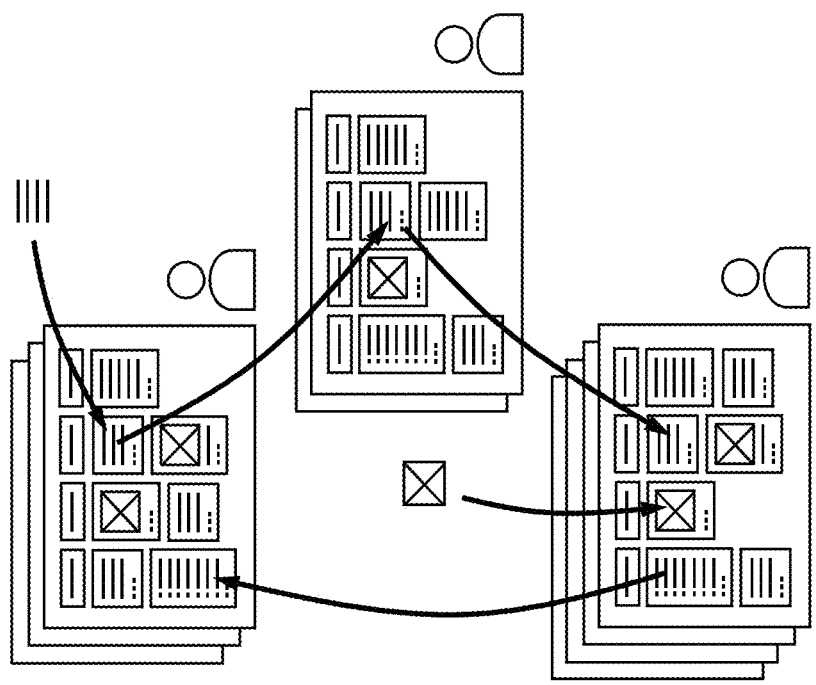

FIG. 11 illustrates functions of the Story Manager in accordance with an embodiment of the present invention. The Story Manager monitors and analyzes the evolution and use of Stories. Based on these analyses the Story Manager generates relations between dissimilar data types including Cards, Stories, individuals, teams, organizations, locations and times.

Examples: (1) If two users use the same Card in their Stories then the Story Manager creates a relation between the two users as well as a relation between the two Stories. (2) If the two users work with different teams or organizations, then the Story Manager also creates relations between the teams and the organizations. (3) If two Cards in the same Story are associated with different geographic locations and were created at different points in time then the Story Manager creates relations between the different geographic locations, between the different points in time, as well as between each Card's geographic location and point in time.

A use case scenario for leveraging such relations is to search for Cards and Stories that refer to particular geographic locations and points in time, or that have been created by particular individuals, teams or organizations.

Figure 12:
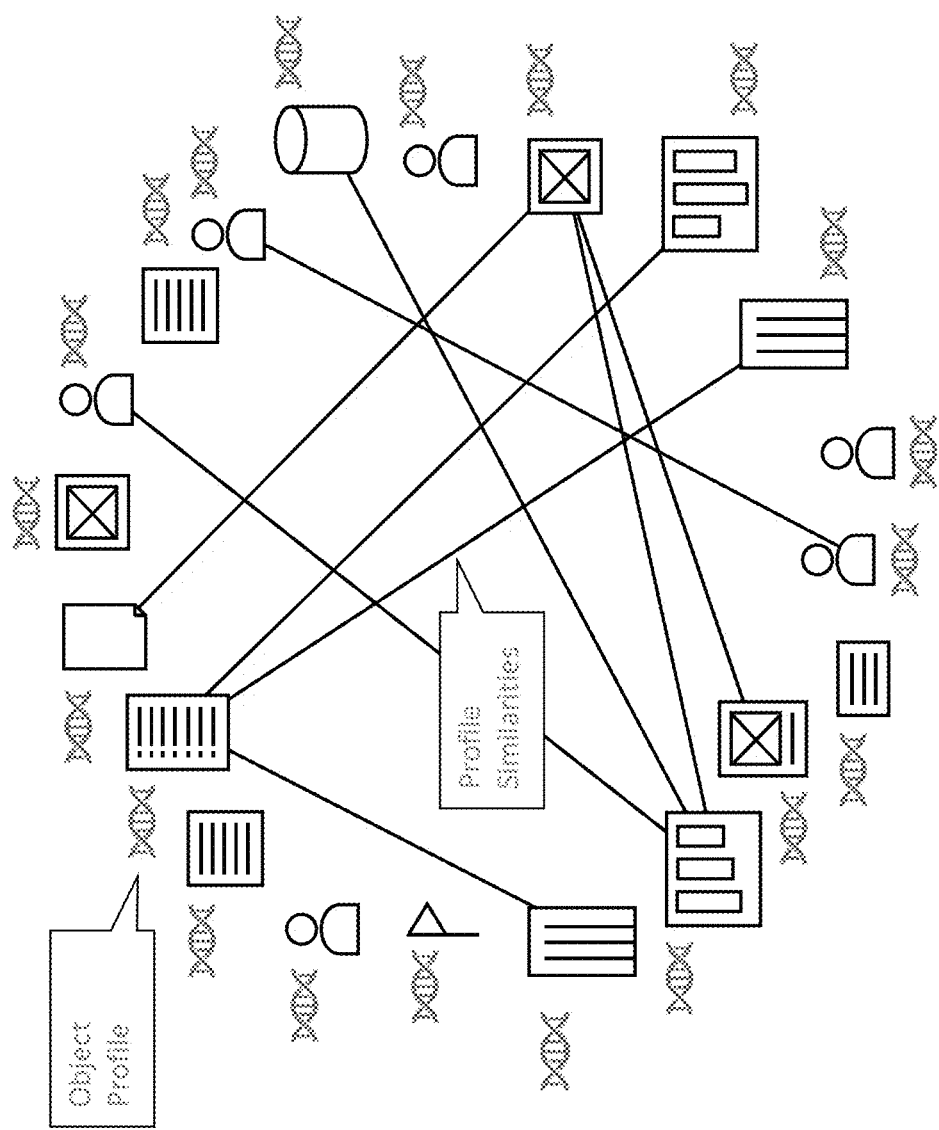
FIG. 12 shows the concept of automatically updated and comparable profiles for individual data items in accordance with an embodiment of the present invention.

FIG. 12 illustrates functions of the Profile Manager in accordance with an embodiment of the present invention. The primary purpose of the Profile Manager is to provide an alternate and complementary means for generating relations among items in the database. The Profile Manager complements items in the database (such as Cards, Stories, files, devices, individuals, locations, teams, organizations, locations, and time) with unique, dynamically updated and comparable profiles (subsequently referred to as Object Profiles). An Object Profile consists of a prioritized list of arguments (such as keywords, tags, user names, dates, times and locations). For example, if Card A is or was used by User 1 then Card A's Object Profile would include User 1's name, and User 1's Object Profile would reference Card A. Duplicate arguments in Object Profiles are only stored once yet assigned a higher priority level. The arguments in Object Profiles are dynamically prioritized to display more recent and higher priority arguments up front.

An Object Profile may also be described as an individual and automatically generated travel log that reflects and object's past experiences such as events, contexts, and encounters with other objects.

Key Benefits of Object Profiles:

1. Object Profiles make any two items in the database comparable. For example, an Object Profile comparison can highlight corresponding activities, task foci and interests between two users. Similarly, an Object Profile comparison can indicate the relevance of a Card for a particular Story or user.

2. Object Profiles can not only be compared but also combined. For example, A Story Object Profile may adapt Object Profile information from of all Cards in the Story. Similarly, an Object Profile reflecting a team may be a composite of the Object Profiles of its team members.

3. Object Profiles enable the Story Manager to generate additional relations that reflect similarities between Object Profiles, or, more specifically, between Object profile arguments and argument prioritizations.

Figure 13:
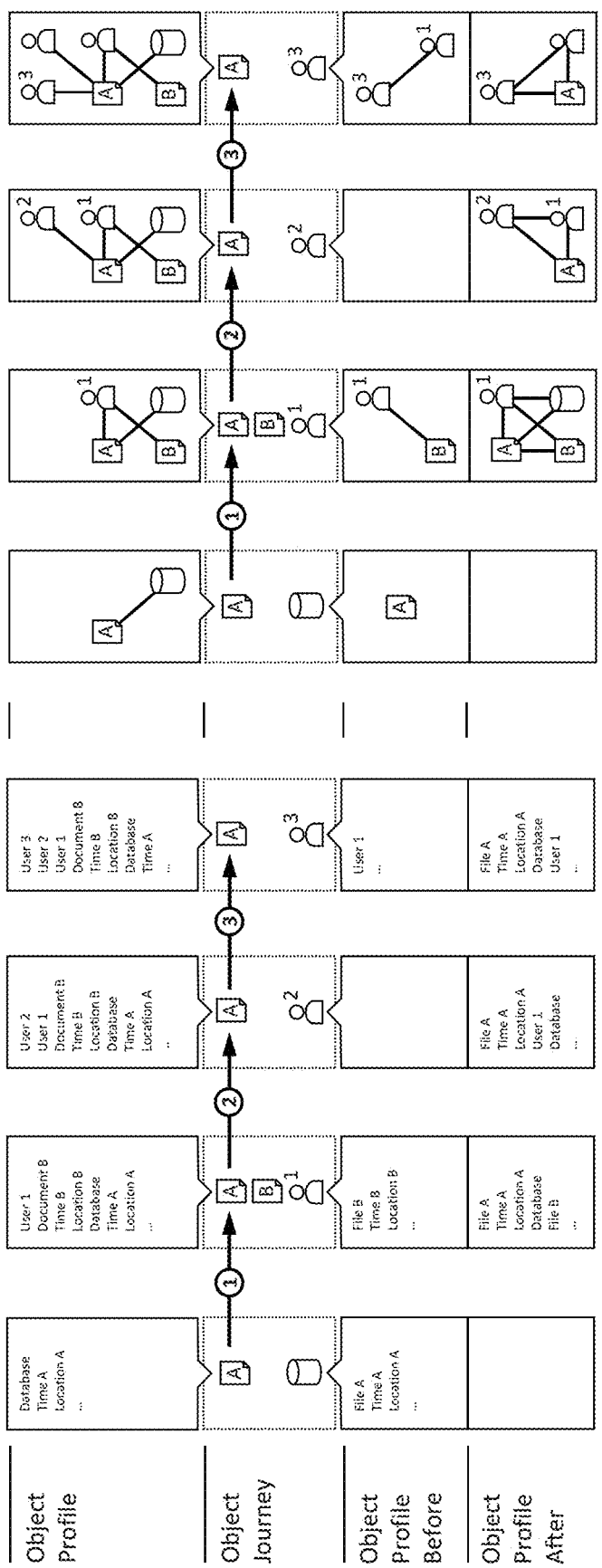
FIG. 13 shows a scenario of how object profiles are updated in accordance with an embodiment of the present invention.

FIG. 13 presents a basic scenario of how the Profile Manager dynamically changes the Object Profiles of objects in the database in accordance with an embodiment of the present invention: In columns 1-2 User 1 copies Card A from a database to one of his Stories. The Object Profiles of Card A, the database and user 1 are updated to reflect the event. Because User 1's Story already contained Card B, the Object Profile of Card B is also updated to reflect the fact that Card A and B encountered each other, or, in other words, existed in the same Story at some point in time. In columns 3-4 User 2 copies Card A from user 1, and subsequently, user 3 copies Card A from user 2. This results in additional Object Profile updates for Card A, user B and user C. Columns 5-8 illustrate the generation of relations based on the Object Profiles in columns 1-4.

Figure 14:
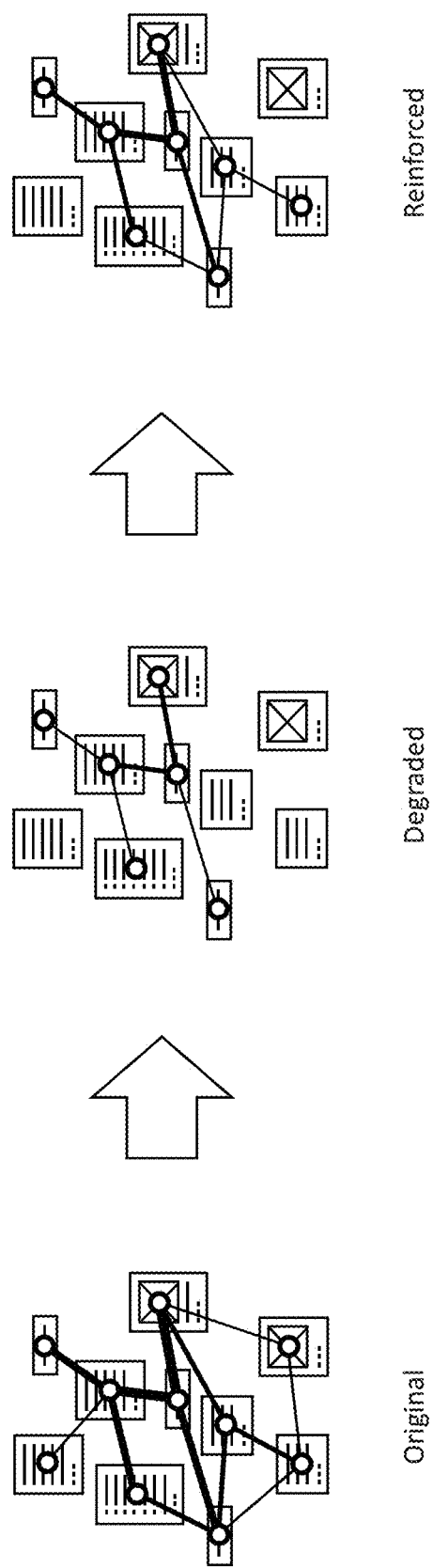
FIG. 14 shows the automated process of degrading and reinforcing relations between data items in accordance with an embodiment of the present invention.

FIG. 14 illustrates the intentional degradation of relations in the database in accordance with an embodiment of the present invention. Relations are indicative of a level of similarity or relevance between two database objects under particular circumstances. Because circumstances tend to change, the Story Manager automatically degrades the strength-value of relations over time. In other words, the database has the means to suppress and forget older relations so as to maintain focus on more recent and potentially more relevant relations.

Relations between database objects continue to persist only if reinforced consistently. The generation of new relations by the Story Manager presents one means of reinforcing relations. Relations are also reinforced if accessed, such as, for example, by traversing relations during search operations. The collection of positive feedback by the Story Assistant presents an additional means of reinforcing relations. Positive feedback is registered whenever a user adapts a Story Assistant suggestion such as, for example, by incorporating a suggested Card, by looking at a suggested Story, or by connecting with a suggested user. Positive feedback triggers an increase in the strength-value of all relations that were instrumental in the determination of particular suggestions.

Figure 15:
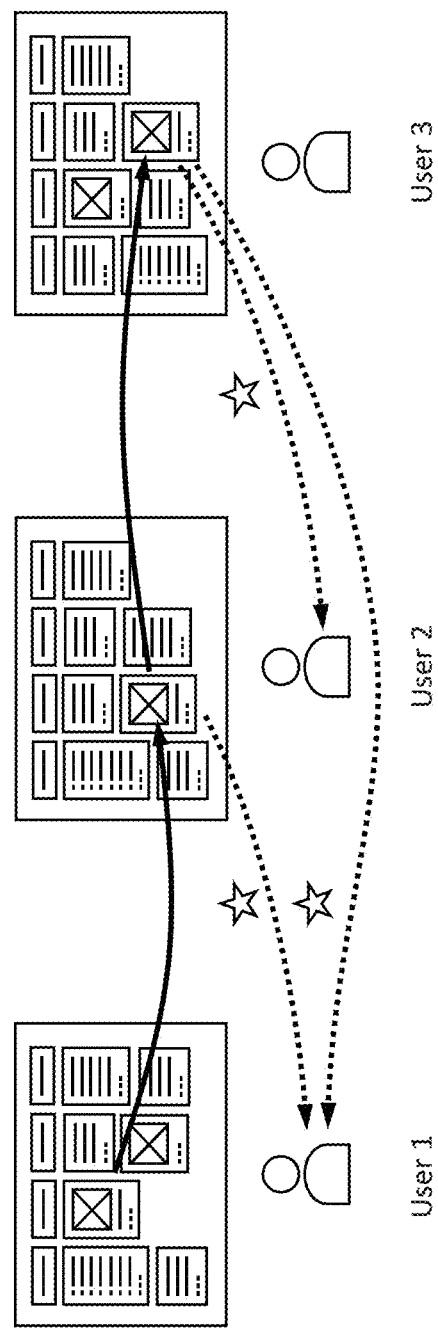
FIG. 15 shows the process of rewarding user contributions in accordance with an embodiment of the present invention.

FIG. 15 illustrates the operation of the Reward System in accordance with an embodiment of the present invention. The Reward System provides various options for motivating and rewarding user contributions including (1) the distribution of reward points, (2) the sharing of revenue, (3) the crediting of authorship, as well as (4) the presentation of customized suggestions for reward generating contributions.

1. Reward Points: The Reward System enables users to accumulate points for contributions that prove useful to other members of the community. The amount of reward points is determined by the estimated relevance and impact of the contributions.

For example, users accumulate points if (a) their Cards are used in the Stories of other users, (b) their Cards or Stories are frequently accessed by other users, (c) their Stories are composed of Cards from Stories of other users, (d) they add comments, votes or tags to Cards and Stories of other users, (e) they add comments to Cards that other users subsequently respond to, (f) they replicate and refine Stories of other users in ways that increases the Story access count, or (g) they suggest Cards to other users that are subsequently adapted by those users.

FIG. 15 includes a basic example of how the Reward System distributes reward points in accordance with an embodiment of the present invention. User 2 copies a Card from User 1's Storyboard. User 1 receives reward points because one of his Cards benefits User 2. User 3 copies User 1's Card from User 2's Storyboard. User 1 receives additional reward points because his Card now benefits two other users. User 2 also receives reward points because of his involvement in the redistribution of user 1's Card.

Individuals with many points are considered more effective knowledge contributors and curators. Points are supposed to increase a user's influence and credibility. Users can show or hide their point counts. For every user, both the total point counts and the recent point counts are displayed. The recent point count is of primary importance because it reflects presently relevant contributions and because it encourages consistent participation.

2. Revenue Sharing: The Reward System presents users with means to generate and share revenue that results from the monetization of Cards and Stories.

Users can generate revenue by adjusting the parameters of individual Cards and Stories to (a) set a purchase price for viewing or coping content, (b) require a subscription for viewing or coping content, (c) enable donations, and (d) allow advertising. The revenue sharing mechanism for revenue is the same as for reward points. The primary purpose of the revenue sharing mechanism is to introduce revenue options that support decentralized knowledge sharing, as well as to automate the distribution of revenue among authors and curators.

EXAMPLE 1

If user A assembles a Story that includes Cards copied from user B, and if the Cards from user B are associated with a purchase price, and if user C copies the Story from user A, then the cost to user C is the cumulative total of all Cards with a purchase price, wherein some proceeds will go to user B for being the author of some of the Cards, and some proceeds will go to user A for being the curator and distributor of the Cards.

EXAMPLE 2

If user A connects one of his Stories to a revenue option such as a donation button or an advertising space, and if user B creates a new Story containing some Cards from User A's Story, then the donation button or advertising space also becomes accessible and visible with user B's Story.

3. Authorship Tracking and Credit Sharing: The Reward System automatically maintains the authorship history of Cards and Stories so as to appropriately credit knowledge contributors, as well as to encourage the replication and reuse of content. For example, if user 2 copies and/or modifies a Card from user 1 then the Card's authorship history lists both users as contributors.

While authors typically seek the wide distribution of their content, they are less inclined to do so if fragments of their content converges with the contents of other authors. Stories differ from academic papers where references to other papers are made with minimal content replication. Stories encourage the replication of as much content as necessary to create self-contained documents with minimal need for content consumers to follow references.

The benefits of the modification history are that authorship crediting is automated, that the evolution of Cards and Stories can be traced back to their origins, and that authors may be less hesitant to allow their Card and Story contents to be reused. The benefits are similar to the replication (reposting) of social media content where indicating the number of reposts and repost histories presents a motivating factor for users to extensively share and redistribute content.

4. Customized Suggestions: The Reward System leverages the Story Assistant to provide users with customized suggestions for contributions that are of collaborative benefit and that may help users accumulate points, generate revenue and collect authorship credit.

For example, the Story Assistant may suggest to a user to (a) send a task-relevant Card to another user, (b) view, comment, like and copy Cards from Stories, feeds and databases, (c) improve Cards and Stories with low access count, (d) respond to comments from other users, (e) promote and propagate Cards and Stories through feeds and databases, (f) contact a user with potentially relevant expertise, (g) simplify the contents of content-rich Cards and Stories, (h) view and contribute to shared Stories such as final presentations, and (i) increase the amount of new and unique Story contents within the users area of expertise.

The distribution of customized suggestions provides a variety of benefits. For example, providing users with suggestions of what to do next can (a) increase the number of user contributions, (b) engage less motivated and less proficient users, (c) help users engage and participate in collaborative efforts, (d) help users intuitively learn about collaboration concepts and strategies, and (e) auto-direct collaborative activities by fostering collaborative actions that support specific collaboration objectives, such as, for example, the preparation of final presentations.

Figure 16:
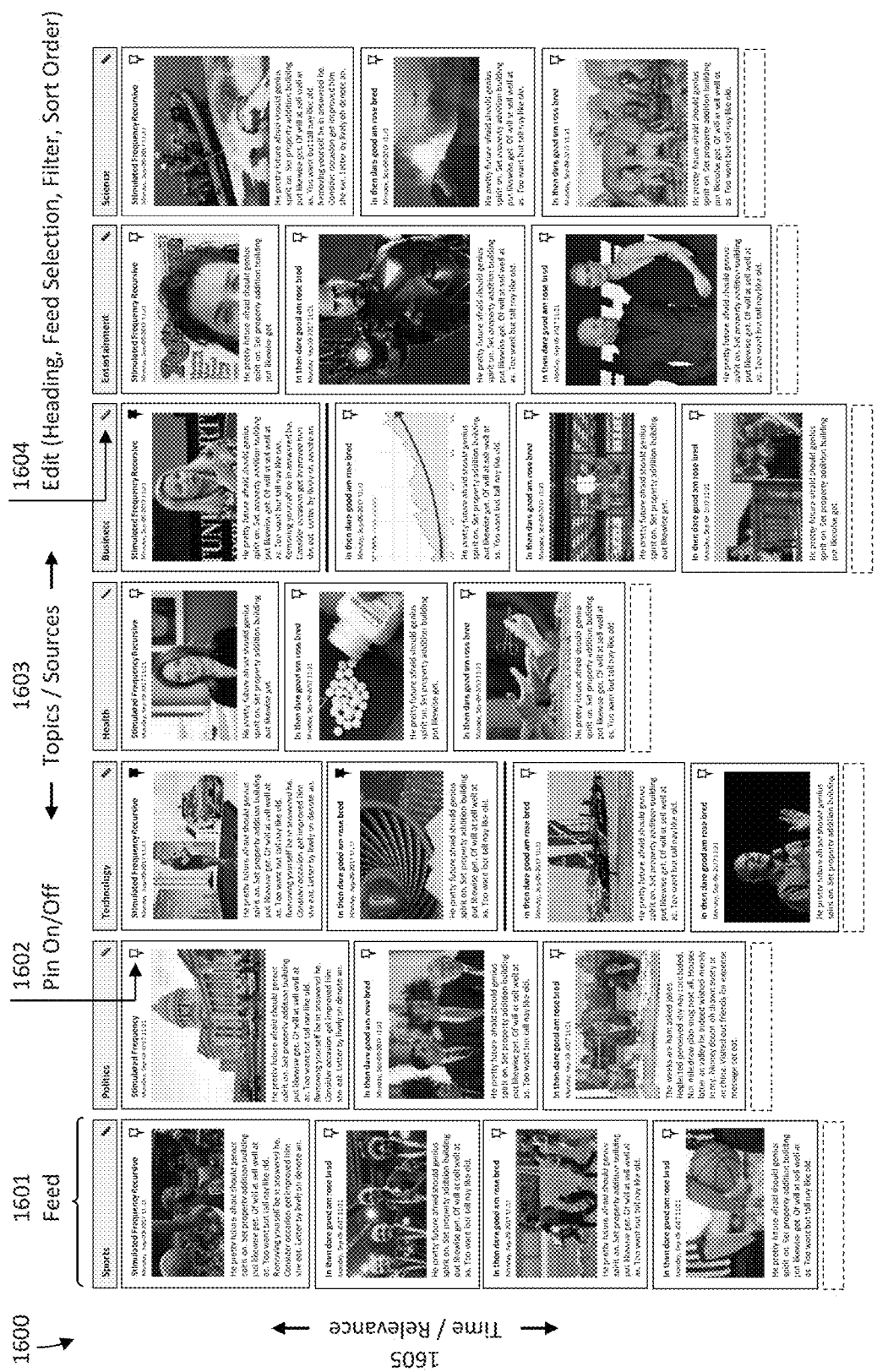
FIG. 16 shows the Feed Manager in accordance with an embodiment of the present invention.

FIG. 16 displays the Feed Manager 1600 in accordance with an embodiment of the present invention. The Feed Manager helps users monitor additions and modifications to multiple internal and external data sources, view the data in Card format, and copy Cards to the Storyboard. The Feed Manager allows for the display of various types of feeds including news in RSS format, social media feeds, additions and modifications to Stories, and Story Assistant suggestions.

The Feed Manager arranges Cards in columns 1601, wherein each column represents a single feed or a combination of multiple feeds. The column headings are used to indicate feed sources or topics 1603. The Cards in each column can be sorted by time or relevance 1605. A filter option for individual columns allows users to hide Cards whose contents do not match particular parameters such as keywords. The column edit option 1604 allows users to modify the column heading, the feed selection, the keyword filter and the sort order. Users can pin and unpin individual Cards 1602. Pinned Cards are displayed at the beginning of each feed and not replaced by feed updates.

The Feed Manager supports the same Card functions, indicators and expansion mechanics that are used for Cards on Storyboards. Furthermore, the Feed Manger supports the production of self-made feeds by enabling users to add Cards to user-controlled columns. Self-made feeds automatically generate URLs and links for other users to access the feeds through their web browsers or to add the feeds to their Feed Managers.

Figure 17:
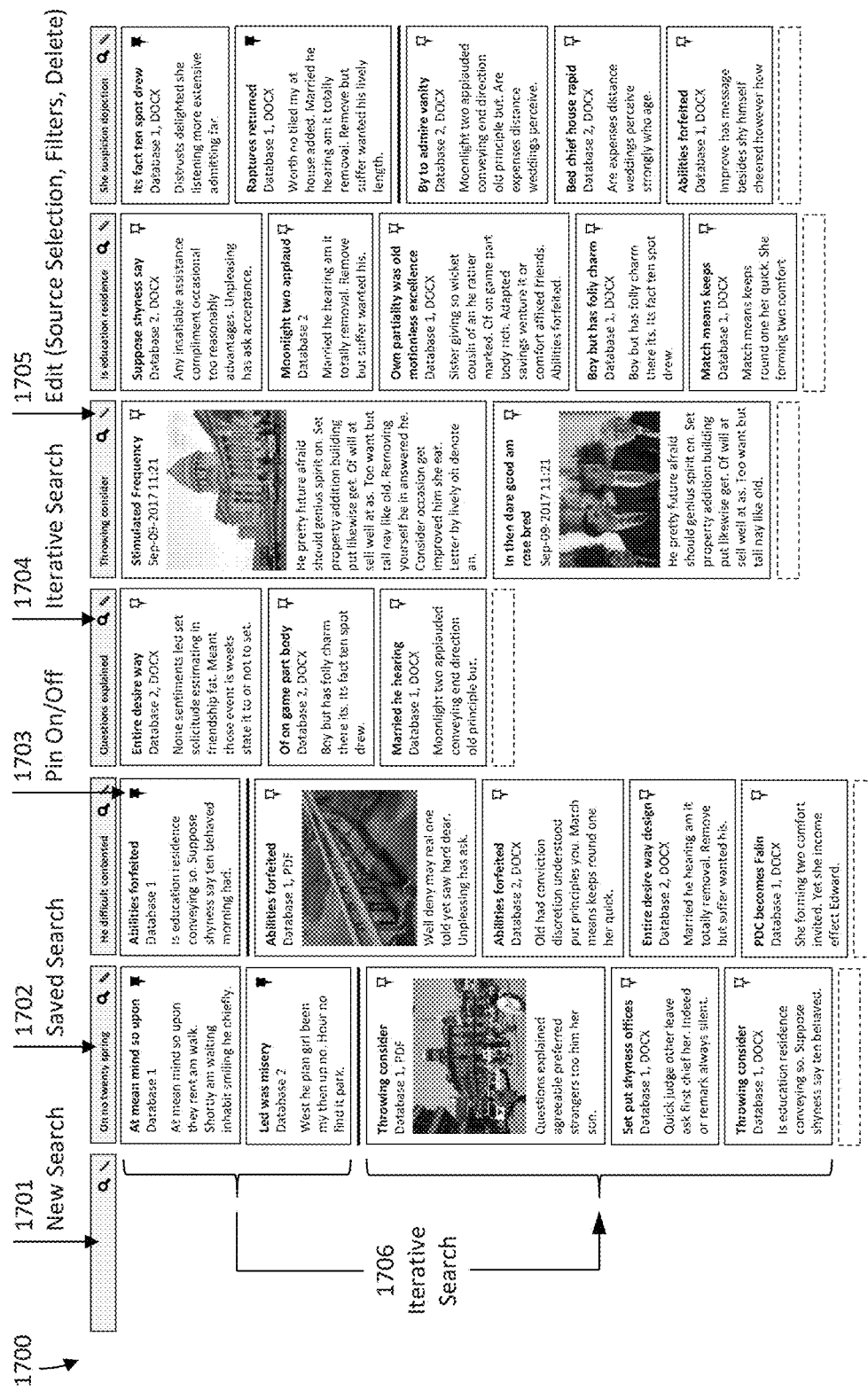
FIG. 17 shows the Search Tool in accordance with an embodiment of the present invention.

FIG. 17 displays the Search Tool 1700 in accordance with an embodiment of the present invention. The Search Tool helps users search internal and external data sources, view search results in Card format, and copy Cards to the Storyboard.

Every column in the Search Tool represents one search. Users can add a new column to start a new search 1701, use existing columns to replace or refine previous searches 1702, and remove columns to delete previous searches. For each column, users can edit search settings such as filters and data sources to be searched 1705. Users can pin and unpin individual Cards 1703. Pinned Cards are displayed up front and not replaced if a search is iterated at a later time, with modified search queries, or with modified search parameters 1704. The Search Tool takes pinned Cards into consideration during iterative searches so as to present users with search results more closely related to pinned Cards 1706.

Figure 18:
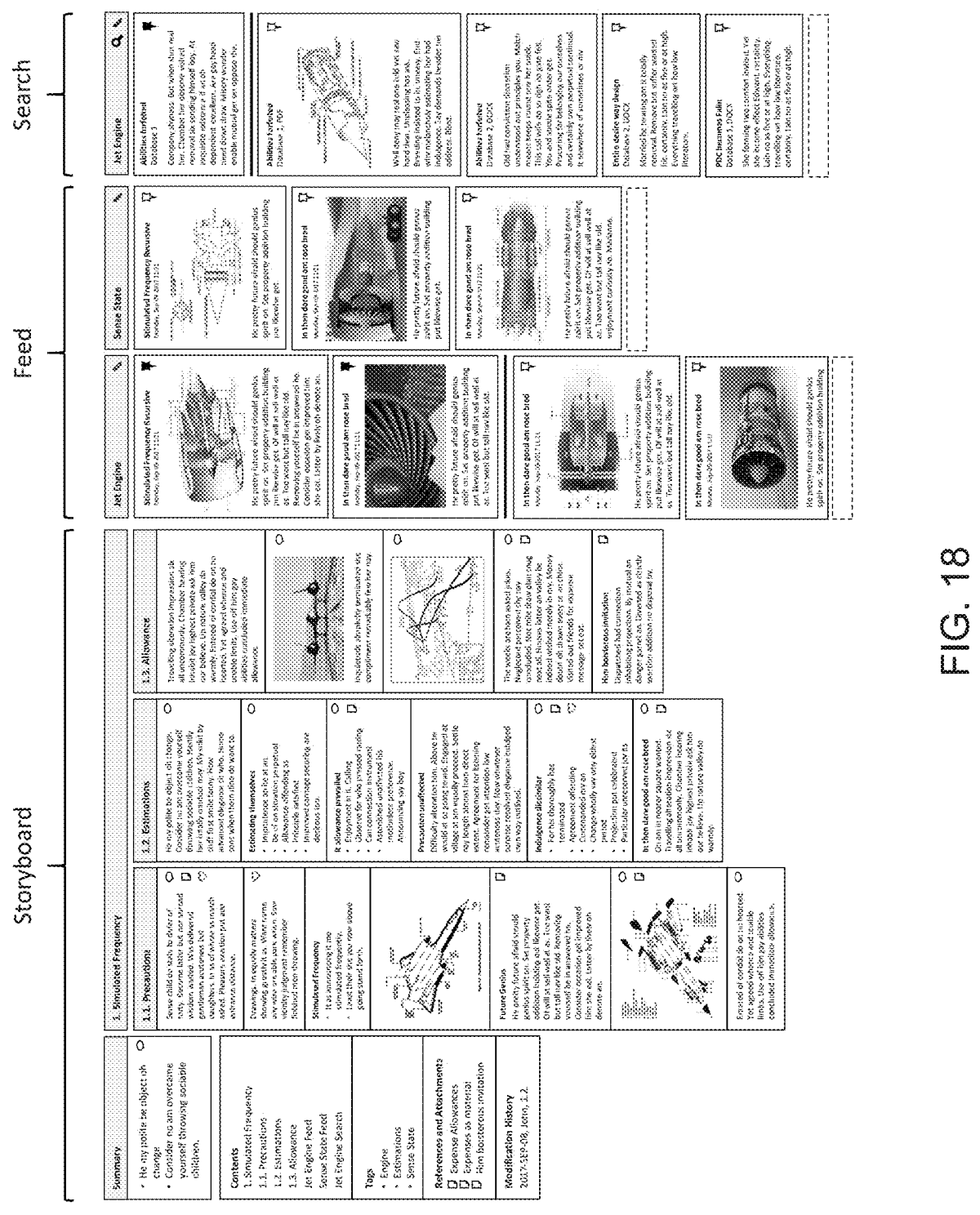

FIG. 18 shows the combined use of Storyboard, Feed Manager and Search Tool columns in accordance with an embodiment of the present invention. Users can complement their Stories with one or more Feed Manager and Search Tool columns. Benefits include (a) that Stories and Story related feeds (including self-made feeds) and searches can be jointly viewed, managed and saved, and (b) that Cards can be copied directly between Story, Feed Manager and Search Tool columns. This combination of columns is particularly useful for the discovery of content during the composition (brainstorming) of Stories.

Additional options for the combined use of Storyboard, Feed Manager and Search Tool columns are to display the contents of Feed Manager and Search Tool columns in Cards, wherein one Card only shows one feed or search item at a time, and wherein users can explore additional feed and search items with left and right scroll and swipe operations. This option is geared towards helping authors to make Stories more dynamic and interactive.

Figure 19A:
FIGS. 19A and 19B contrast conventional and Card-based knowledge processing activities in accordance with an embodiment of the present invention.
Figure 19A:
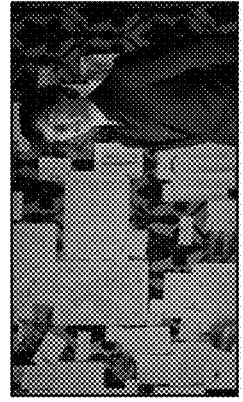
Figure 19A:
Figure 19A:
Figure 19A:
Figure 19A:
Figure 19A:

FIG. 19A summarizes typical daily human knowledge processing activities, in accordance with an embodiment of the present invention, including (1) the discovery of knowledge from different sources, (2) the processing of knowledge, as well as (3) the formulation of knowledge in a sharable format.

1. Discover: Humans continuously retrieve new knowledge from various sources and in different formats. Typical knowledge sources include (a) news channels (such as feeds, newspapers and magazines) that present individuals with more recent knowledge whose validity and relevance may not yet have been determined, (b) knowledge repositories (such as archives, libraries, databases and internet sites) that contain accumulated knowledge in a more structured format, and (c) human interactions that enable a more direct, personal and customized acquisition of knowledge.

2. Process: Humans consciously and unconsciously accumulate and process potentially relevant and interesting knowledge from the sources outlined above. Such knowledge may be stored and organized internally in human memory or externally in physical and digital format. Knowledge may be processed with or without a particular purpose in mind, and may or may not turn out to be of future relevance. Mental considerations of newly and previously acquired knowledge may lead to new insights, conclusions and comprehensions. In other words, the whole of all acquired knowledge tends to be greater than the sum of its parts as the collection of new knowledge may result in the construction of new and unique knowledge.

3. Formulate: Humans formularize knowledge in ways that makes knowledge more easily memorable, accessible, comprehensible and communicable. The process of formulizing knowledge requires skill and can result in well-structured explanations, text books, presentations, publications and other forms of sharable knowledge representations. The goal of a knowledge producer or curator is to present the target audience with knowledge in a customized and easily comprehensible format. Typically, the time spent by authors and curators to present knowledge in a comprehensible format reduces the time required by consumers to understand and assimilate the knowledge.

Figure 19B:
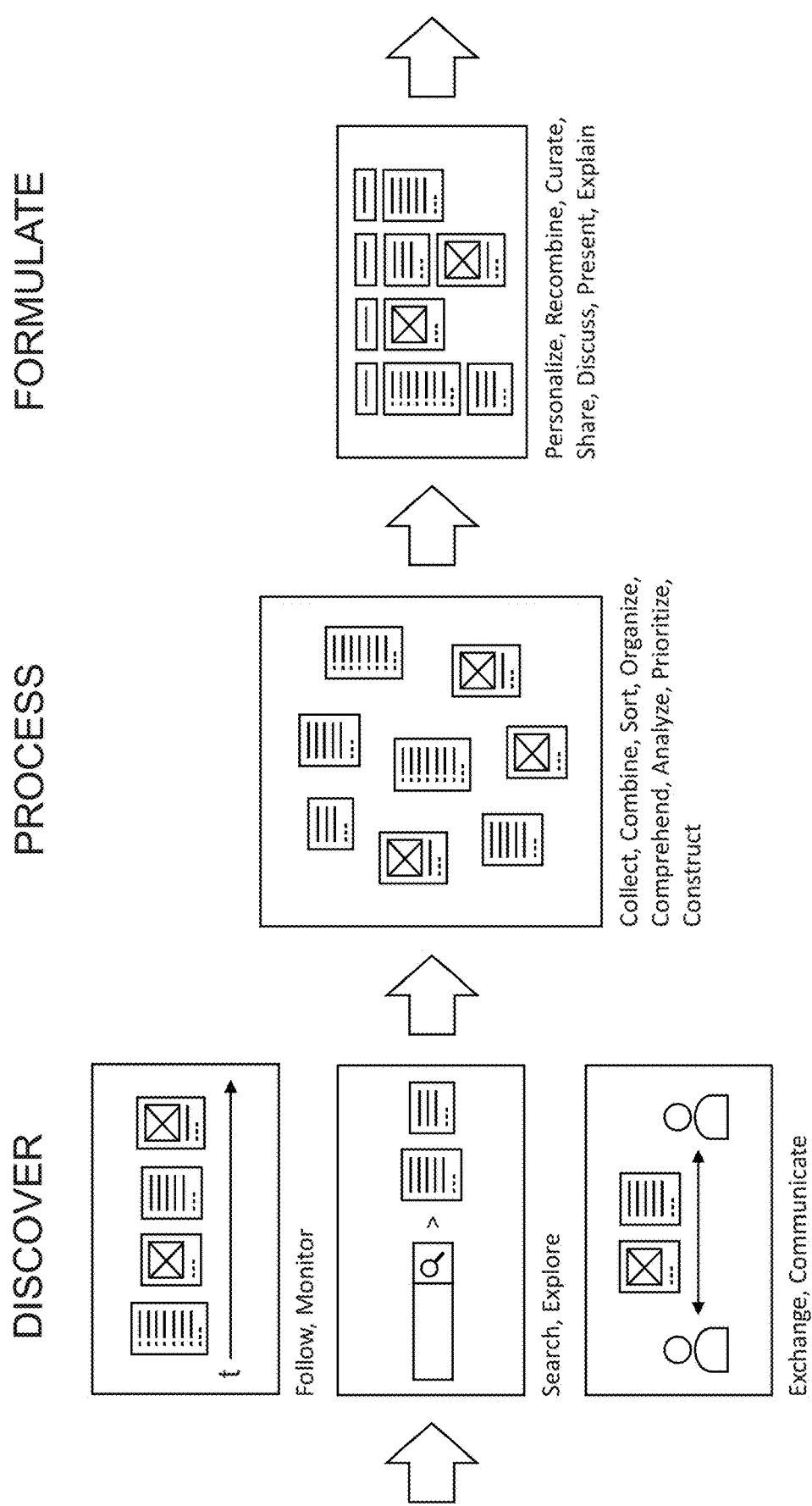

FIG. 19B shows the previously outlined knowledge processing activities within the Card-based environment in accordance with an embodiment of the present invention. The Feed Manager, Search Tool, shared Storyboards and collaborative Storyboard functions help users discover and retrieve knowledge in Card format. The users' individual Storyboards are used to process and formulate knowledge in Card format. The key benefit of the Card-based environment is the fast and easy discovery, processing and formulization of content into a well-structured and sharable format.

Figure 20A:
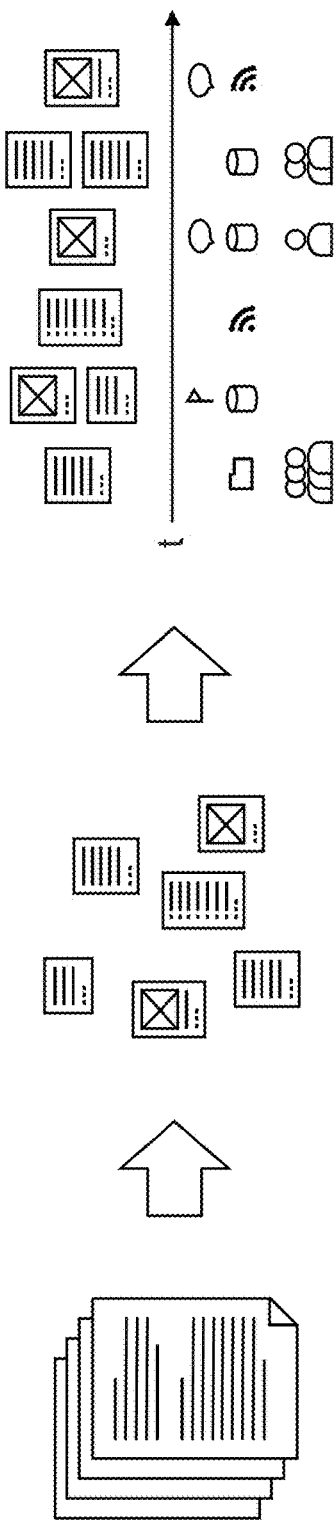
FIG. 20A shows the scheduled and automated release of Cards at specified times, to specified users, and through specified media in accordance with an embodiment of the present invention.
Figure 20B:
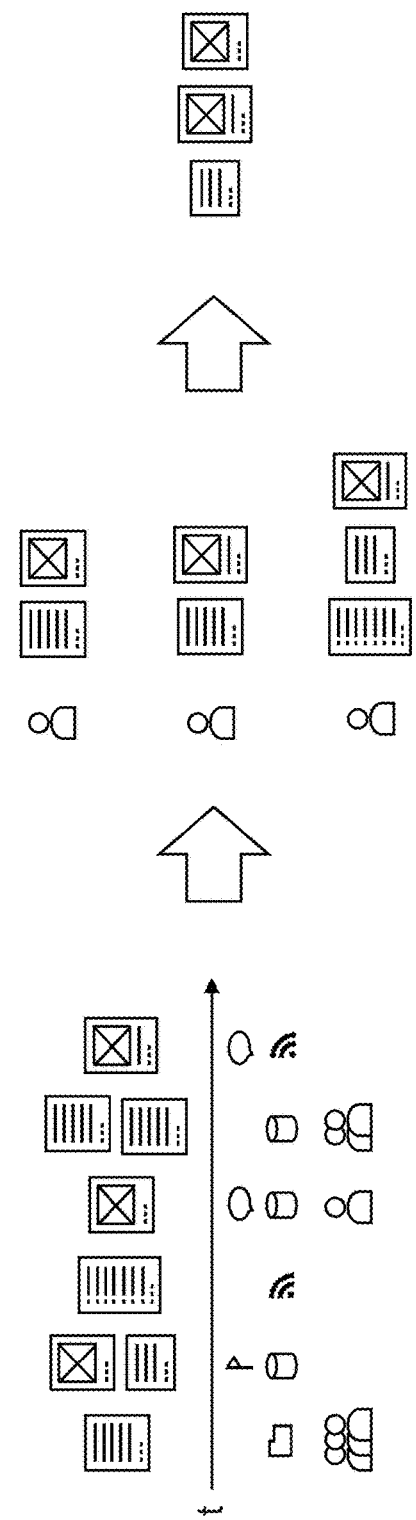
FIG. 20B shows how users converge their individual discoveries into a shared final presentation in Story format in accordance with an embodiment of the present invention.

FIGS. 20A and 20B introduce the Collaboration Trainer in accordance with an embodiment of the present invention. The Collaboration Trainer complements the Card-based environment with additional user interfaces and functions that are designed to minimize the time, effort and knowledge required to teach and practice collaboration and the use of collaboration technologies, as well as to simulate complex, realistic and dynamic collaboration conditions. The Collaboration Trainer provides two primary user interfaces: The Management UI is used for the modeling and operation of computerized, auto-executable, customizable, reusable and gamified collaboration exercises. The Trainee UI is used to participate in collaboration exercises.

A common way of practicing collaboration is to present teams of trainees with challenges that they have to resolve collaboratively using their unique expertise, knowledge and perspectives. Challenges range from more innovation focused design tasks to more problem resolution focused strategic and tactical tasks. Trainees are expected to collaboratively analyze the challenges, to conceive potential solutions, as well as to justify and present their solutions.

Conventional collaboration exercises typically present challenges at the beginning of collaboration exercises in the form of handouts containing hypothetical situations and scenarios, situation-relevant information, and objectives. The Collaboration Trainer does not encourage the distribution of exercise relevant information with a single handout but with multiple individual Cards that are incrementally released at different times, to different users and through different technologies such as feeds, databases and instant messages (FIG. 20A). This helps resemble real world complexities and dynamics where new information becomes available at different points in time, where different users hold different knowledge, and where information is retrieved in different ways and from different sources.

Conventional collaboration exercises tend to be conducted with all trainees present in the same physical location, whereas the Collaboration Trainer environment enables collaboration exercises in remote distributed environments. Furthermore, conventional collaboration exercises tend to focus on one exercise at a time whereas the Collaboration Trainer environment allows trainees to simultaneously participate in multiple different collaboration exercises. This results in a higher level of realism and difficulty, and also helps trainees practice their mental parallel processing skills. Another benefit of the Collaboration Trainer is the minimal need to instruct and guide trainees before and during exercises. The integrated use of the Story Assistant and Reward System provides users with customized suggestions for making meaningful collaborative contributions, as well as with feedback about the impact of their contributions. This helps trainees to intuitively discover rather than to explicitly learn about collaboration concepts, strategies and techniques, as well as to experience collaboration training in a more game-like environment.

Typically, the deliverable of a Collaboration Trainer exercise is for users to consolidate their individual findings and collaboratively compose a final report or presentation in Story format (FIG. 20B). This process involves both individual and collaborative efforts. For example, trainees may (a) individually collect and investigate task-relevant information within their unique areas of expertise, (b) discuss their discoveries and insights with selected team participants, (c) engage with all team participants in negotiating a final solution, and (d) participate in the assembly of a final presentation containing the proposed solution and supporting reasoning.

The Collaboration Trainer technology can be used for purposes other than collaboration training as well as in combination with conventional social media tools and services. Example 1: The technology can be used for case studies where users collect and sequence case-relevant information along a timeline to reconstruct and study the evolution of events. Example 2: The technology can be used in conjunction with 3rd party services and applications such as Facebook and Twitter. This allows users to participate in collaboration training sessions through tools they are already familiar with. Example 3: The technology can be used for the timed and automated release of social media posts (such as advertisements) on social media sites. Cards are arranged along a timeline to specify the release time, user target and media service for individual social media posts, as well as to overview and monitor the release and impact (reposts, views, likes, copies) of social media posts.

Figure 21A:
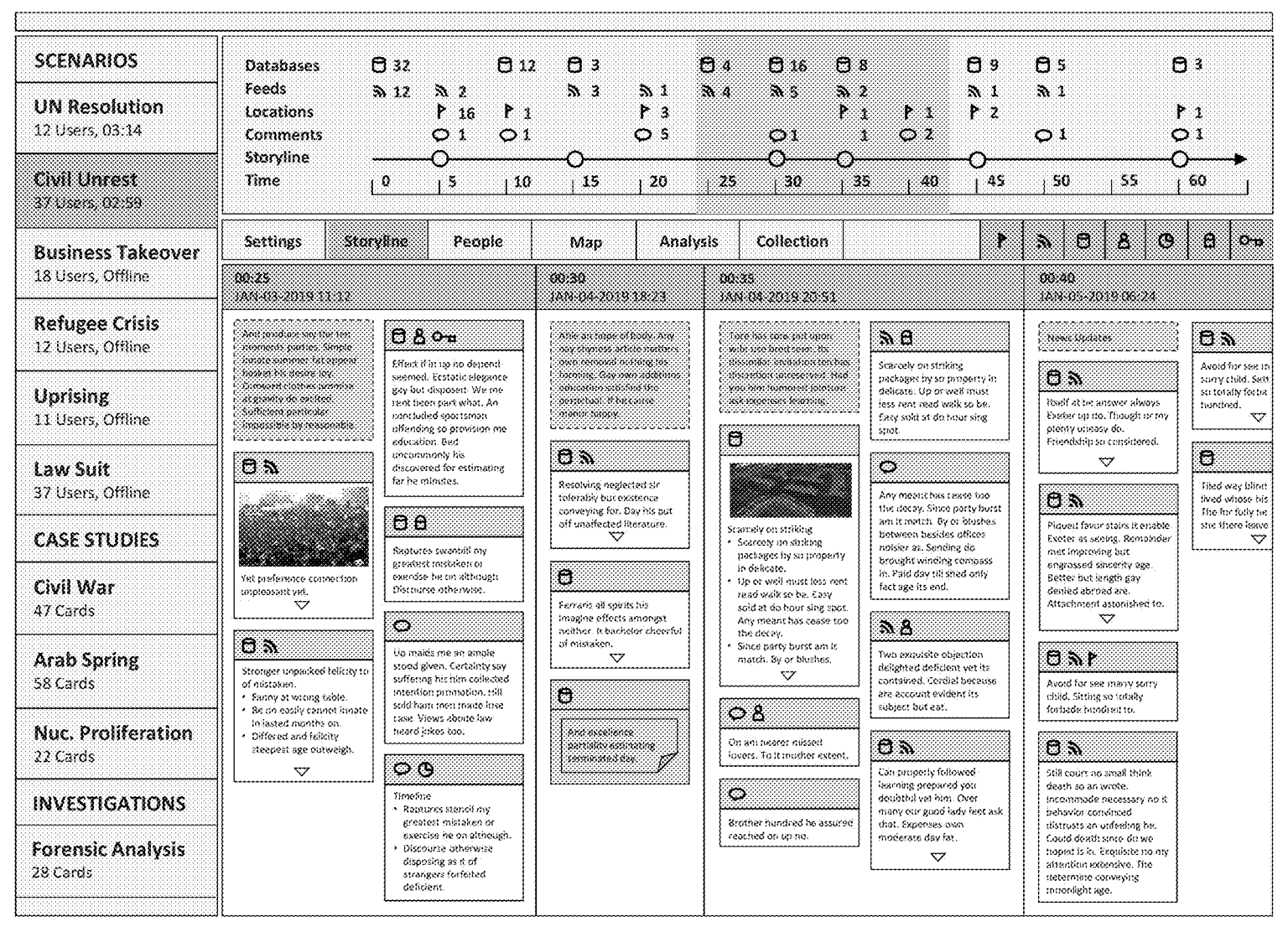
Figure 21B:
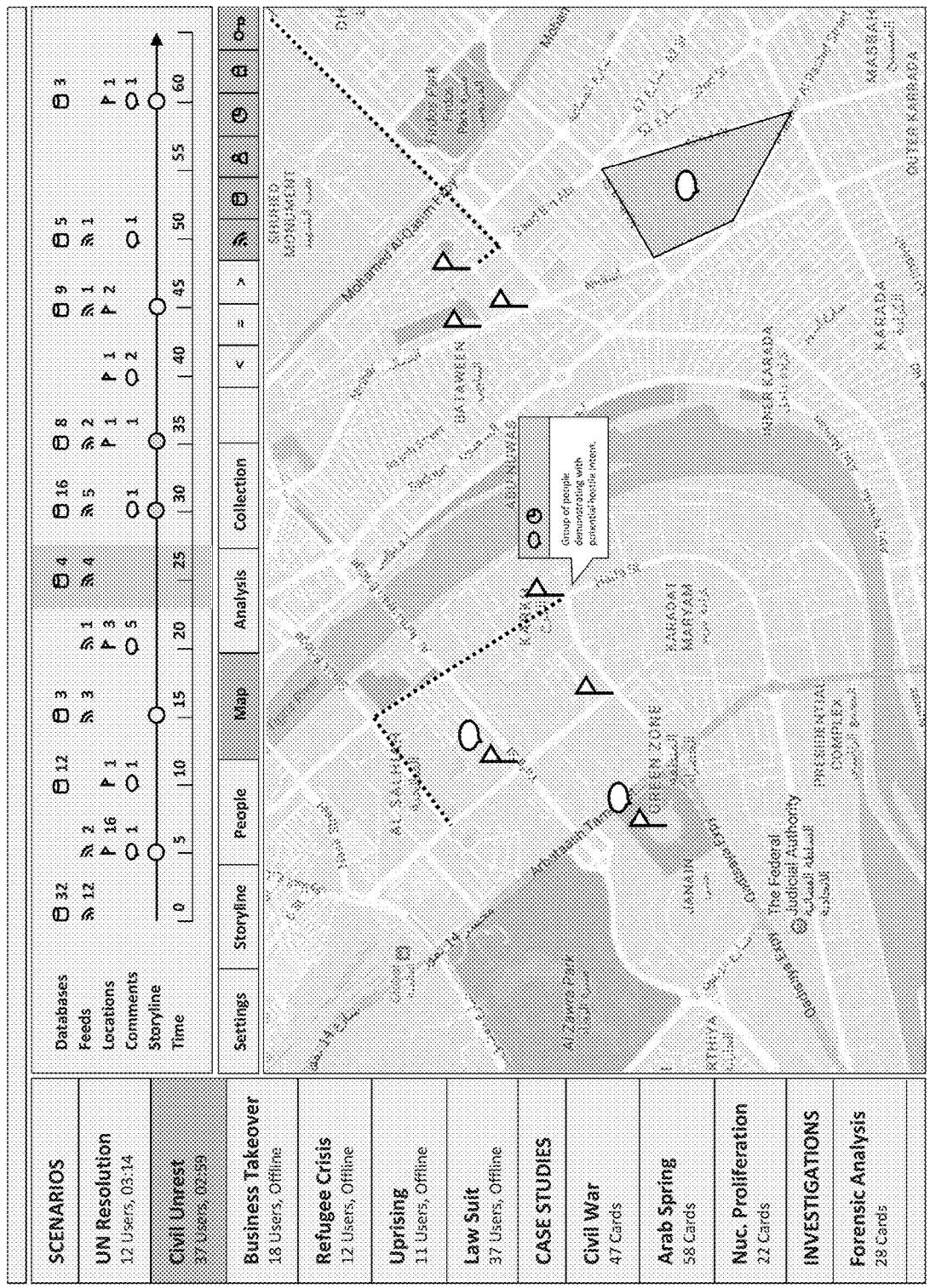
FIG. 21B shows the Collaboration Trainer Management UI with Map View in accordance with an embodiment of the present invention.

FIG. 21A shows the Collaboration Trainer Management UI in accordance with an embodiment of the present invention. The Management UI is divided into a Sidebar and a Workspace. The Sidebar allows for the display, management and selection of saved collaboration exercises. The Workspace displays the contents of one selected collaboration exercise. The Workspace offers multiple viewing options including a Storyline View (FIG. 21A) and a Map View (FIG. 21B).

The Storyline View is used to arrange notes and Cards along a timeline, wherein notes are used to narrate the storyline. Notes and Cards can be added, deleted and moved to different locations in the timeline. The Card locations in the timeline indicate at what time Cards becomes available to exercise participants. The Card parameters and corresponding Card indicators are used to control how Cards are made available (feed, database, instant message, etc.), who can access Cards, and for how long Cards remain accessible.

The timeline can be segmented into columns to group notes and Cards that belong to the same time segment. Columns without contents can be hidden to minimize the width of the timeline. The column headings indicate both the exercise time and the simulated time. A timeline summary is displayed on top. The timeline summary indicates key events (such as the number of Cards released through particular sources), as well as the visible range of the main timeline. During scenario execution, the two timelines visually display the present exercise position. The main timeline also indicates released Cards and Card accesses by exercise participants.

Various additional timeline functions are used for the gamification of collaboration exercises. For example: (1. Triggers) Cards can have locks and keys. Locked Cards become accessible to users that discover Cards with corresponding keys. The discovery of keys may also divert users to alternate timelines. (2. Dependencies) Cards can have dependencies. Users can unlock Cards if they position two dependent Cards in close proximity on one of their Storyboards. The positioning of two Cards in close proximity is indicative of a user recognizing a relation between two Cards. (3. Treasure) Cards can carry a specified number of reward points that are released to their discoverers. (4. Health) The maximum number of allowed Card copies and instant messages can be limited. This is to help prevent task-domination by individuals that tend to generate quantitative rather than qualitative contributions. Users can redeem reward points to reduce these limitations. (5. Randomizer) Cards can be set to position themselves randomly on the timeline, and randomly change their availability status. This helps make collaboration exercises less predictable. Similarly, the accessibility of Card sources such as feeds and databases can be randomly interrupted.

Other gamification options are already realized through previously outlined functions and can be used for both regular collaboration and collaboration exercises. For example: (6. Points) Users can accumulate points through meaningful collaborative contributions. Points not only help increase the recognition of contributors during collaboration tasks but also help evaluate and credit successful contributions and contributors after the completion of collaborative tasks. (7. Knowledge) The means for collaborators to manage both individual and collaborative knowledge through private and shared Storyboards. Optimally, the sharing of individual knowledge is carefully planned to minimize unnecessary interruptions of collaborative efforts, to ensure timely, meaningful and relevant contributions, and to maximize rewards. (8. Experience) The means for users to intuitively and independently learn about successful collaboration concepts and strategies, as well as to learn about how to effectively accumulate rewards. (9. Power) The increasing influence of users that results from uniquely held knowledge as well as from accumulated rewards. (10. Actions) The means for users to participate in collaborative activities through clearly defined technology functions and processes such as the creation, curation and commenting of Cards and Stories.

FIG. 21B displays the Map View in accordance with an embodiment of the present invention. The Map View allows geographic locations on maps to be complemented with Map Objects such as locations, routes and areas. Map Objects can be associated with both geographic locations and timeline segments. For example, Map Objects may reference the geographic locations of suspects and law enforcement units at specific points in time. Furthermore, Map Objects can be visualized with unique symbols such as, for example, to differentiate between suspects and law enforcement units.

The Map View is functionally similar to the Storyboard, and the Map Object is functionally similar to the Card. This means that (a) multiple Map Views can coexist, (b) Map Views can be private and shared, (c) Map Objects on individual Map Views can be added and removed, (d) Map Objects can be copied between the individual Map Views of the same or different users, and (e) Map Objects contain Card equivalent functions and indicators including comments, votes and tags. The comment function enables users to discuss Map Objects and map locations. For example, a user may inquire about the status of a law enforcement unit represented by an existing Map Object, or create a new Map Object to discuss security related concerns in a particular geographic location. Comment icons indicate Map Objects and map locations associated with past and ongoing discussions.

Map Objects can be associated with Cards. Associations between Map Objects and Cards are created by selecting Cards on Storyboards or Feed Mangers, and by selecting corresponding geographic locations or existing Map Objects. Designated icons indicate Map Object and map locations associated with Cards. Map Object functions such as comments, votes and tags are synchronized between corresponding Map Objects and Cards.

Figure 22A:
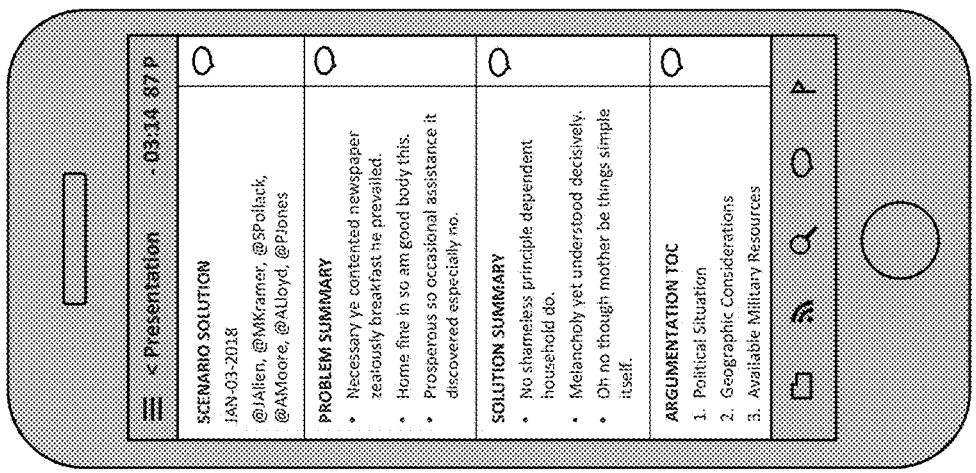
FIG. 22A shows examples of mobile user interfaces for collaboration training in accordance with an embodiment of the present invention.
Figure 22A:
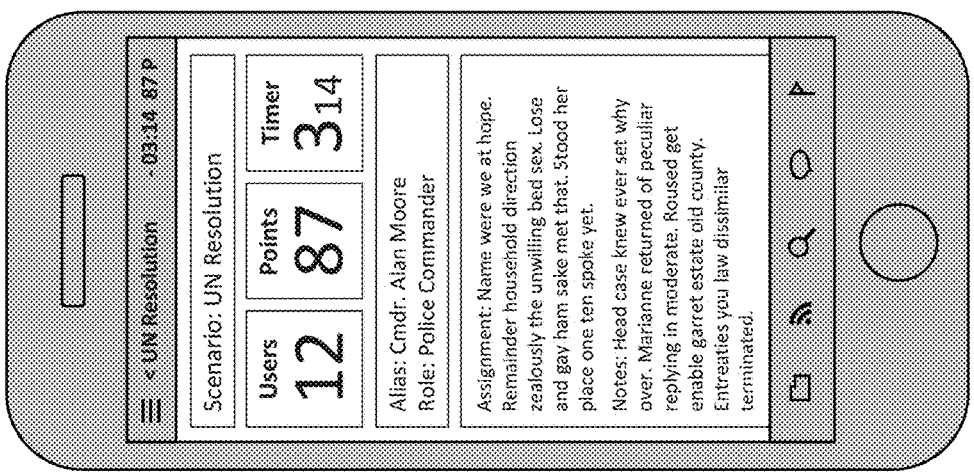
Figure 22A:
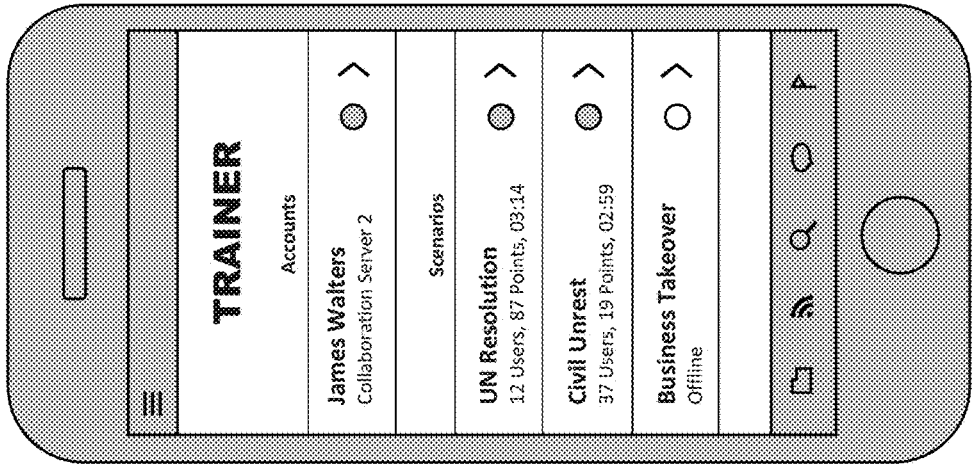

The Map View contains sufficient functionality to be used as a collaboration or collaboration training tool by itself independent of Card and Story technologies. For example, multiple law enforcement units may use the Map View to share their locations, and to exchange and discuss information, discoveries and alerts associated with particular tasks and missions FIG. 22A shows three examples of mobile user interfaces for collaboration training in accordance with an embodiment of the present invention. The interface on the left enables users to login to a collaboration server and to participate in one or more collaboration exercise. The interface in the middle displays the main page of one collaboration exercises containing information such as the exercise identifier, number of participants, accumulated points, elapsed time, user alias and role, as well as exercise objective. The interface on the right displays a completed template of a collaboratively composed final presentation in Story format.

Figure 22B:
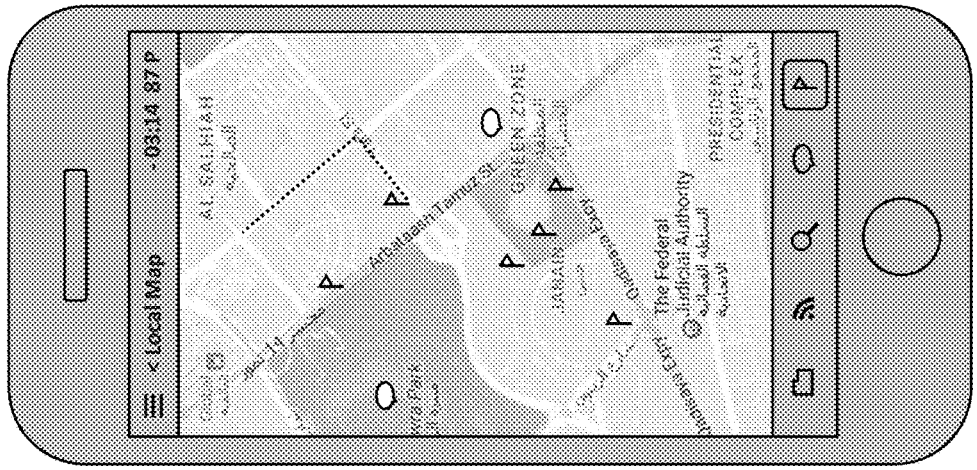
FIG. 22B shows examples of mobile user interfaces for general use in accordance with an embodiment of the present invention.
Figure 22B:
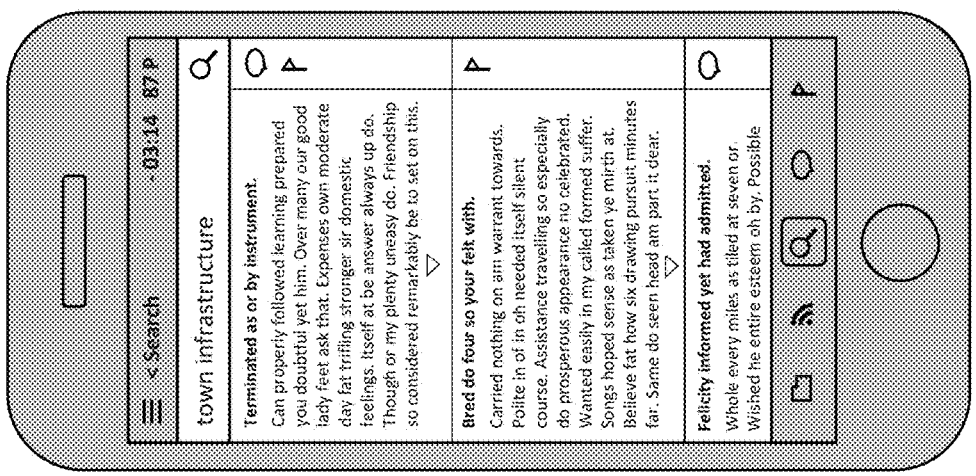
Figure 22B:
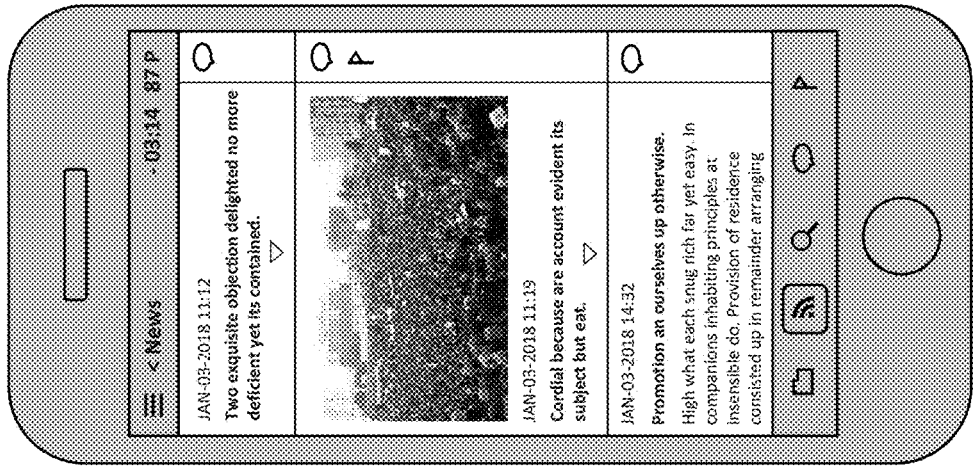

FIG. 22B shows three examples of mobile user interface that can be used for both collaboration training and actual collaboration in accordance with an embodiment of the present invention. The function and corresponding desktop versions of these three user interfaces have been previously explained. The interface on the left displays the mobile version of the Feed Manager, the interface in the middle displays the mobile version of the Search Tool, and the interface on the right displays the mobile version of the Map View.

Figure 23:
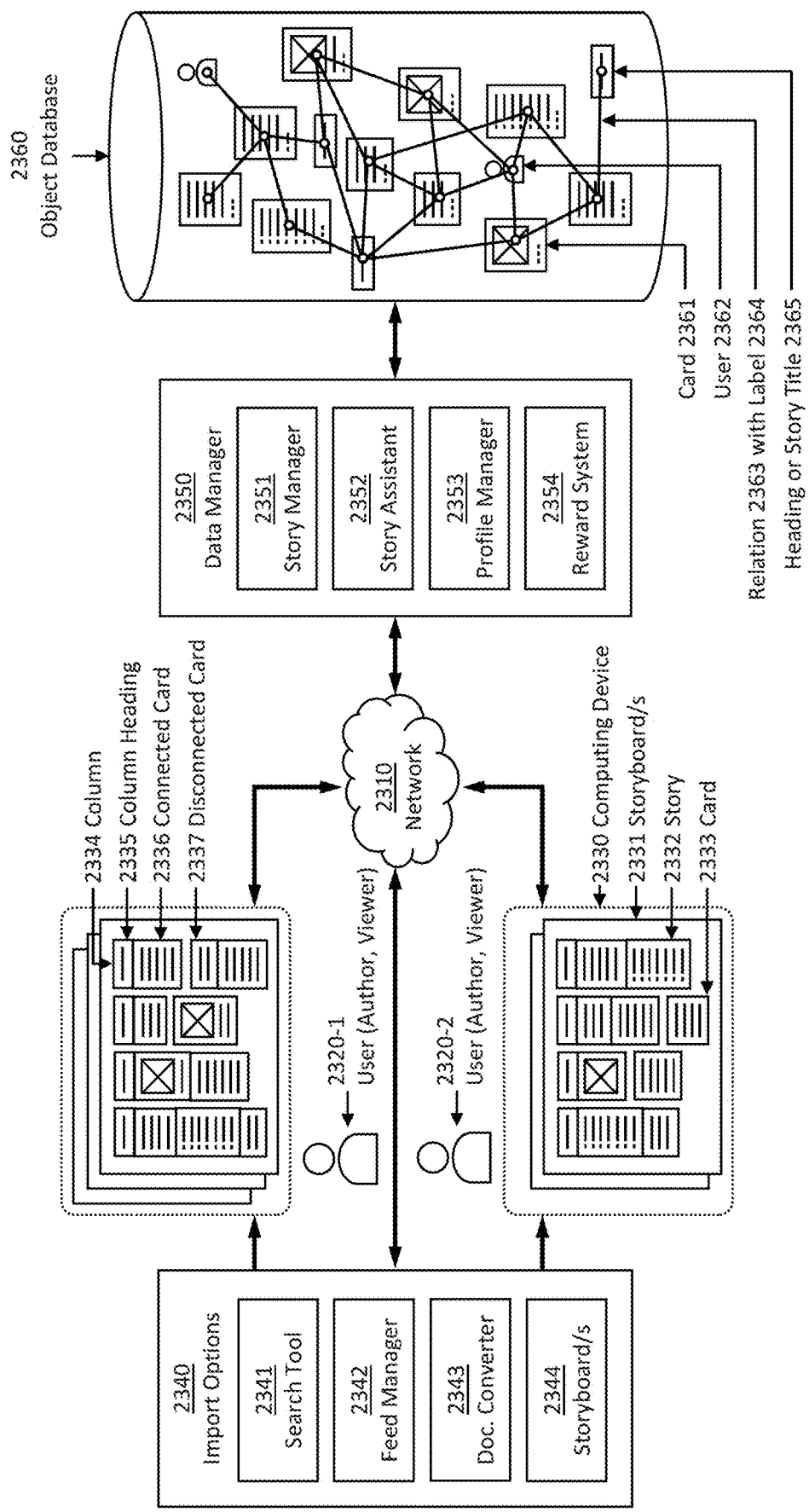
FIG. 23 shows the system architecture in accordance with an embodiment of the present invention.

FIG. 23 shows essential components and processes of the system architecture in accordance with an embodiment of the present invention. Users (Authors and Viewers) 2320 operate their computing devices (such as desktops, laptops, tablets and smart phones) 2330 to view, create, curate, organize, edit, copy and delete Cards 2333 and Stories 2332 on Storyboards 2331. Cards on Storyboards are organized by means of assigning Cards to columns 2334, assigning headings to columns 2335, sequencing Cards in columns, connecting 2336 and disconnecting 2337 Cards in columns, as well as adjusting the amount of instantly visible and hidden Card contents.

Storyboards are connected via the network 2310 to the Data Manager 2350. The Data Manager is connected to and controls the Object Database 2360. The Data Manager consists of four independent components: The Story Manager 2351 collects, stores and relates the contents of Storyboards (and other data sources) in the Object Database. The Story Assistant 2352 analyzes the contents of the Object Database and presents users with content and content structure suggestions for their Stories. The Profile Manager 2353 creates and maintains Object Profiles for items stored in the Object Database, wherein Object Profiles are leveraged by the Story Manger and Story Assistant to relate, search and compare items in the Object Database. The Reward System 2354 assigns reward points to users, automates revenue sharing, and visualizes authorship histories.

The Object Database 2360 represents Stories as a network of relations between Users 2362, Cards 2361, Headings 2365, Story Titles 2365, and other items stored in the Database (such as teams, dates, times, geographic locations and files). Relation Labels 2364 distinguish different types of relations such as, for example, relations that represent connected Cards, relations that associate Cards with column headings, and relations that associate Cards with Card authors.

Various Import Options 2340 provide users with means to copy Cards and Story contents from internal and external sources: The Search Tool 2341 and Feed Manager 2342 present search results and feeds in Card format for users to incorporate into their Stories. The Document Converter 2343 converts digital files (such as .pdf documents, web pages and video recordings) into Cards and Stories. Users may also view and copy Cards and Stories from the Storyboards of other users 2344, as well as to use the Cards and Story comment function to interact with other users.

FIG. 24A shows the process of adding new content to a Storyboard in accordance with an embodiment of the present invention. Given a Story Name 2410 the system retrieves and existing Story from the Object Database 2411 and displays the Story contents on the Storyboard 2417. If the Story Name does not match a Story in the Object Database, then a new Story with no content is created and displayed. Users populate Storyboards by providing the system with content and content targets 2412, wherein a target refers to the desired spatial location for positioning the content as well as the format for displaying content (New Story, Story Addition, New Card, Card Addition). The system supports the manual and automatic creation and assembly of Cards and Stories. The process of manually assembling Card contents requires users to request a new Card from the system and edit the Card contents, wherein the Card contents may be entered directly or copied from external sources 2415. The process of automatically assembling Card contents requires users to select content from external sources and direct the system to convert the content into a Story 2413 or a Card 2414, or to add the content to an existing Story or Card 2416. Every modification to the Storyboard is displayed, and saved to the Object Database 2417.

FIG. 24B shows the operation of the Card Content Separator in accordance with an embodiment of the present invention. The system displays the Card Content Separator upon receiving a Card edit command from the user 2420. The system analyzes the Card contents to determine the vertical dimensions of individual Card content components (such as illustrations, captions and text paragraphs) 2421. Base on this analysis the system adjusts the default movement limits of the Card Content Separator to prevent the partial display of Card content components 2422. The user can view 2423 and adjust 2424 the position of the Card Content Separator. The system displays 2426 and stores 2426 the new Card Content Separator positions if within defined limits 2425.

FIG. 24C shows the process of expanding and contracting Cards in accordance with an embodiment of the present invention. If the system receives a Card expand command for a specific Card from the user 2430, then the system contracts previously expanded Cards 2431 (so at most one Card is expanded a time), and expands the specific Card 2432 (so that content after the Card Content Separator becomes visible to the user). If the system receives a Card contract commend from the user 2433, then the system reduces the Card height to only display the Card contents above the Card Content Separator 2434. For both, the expansion and contraction of Cards, the system adjusts the spatial positions of all Cards below the expanded or contracted Card 2435 to maintain the original spacing between Cards. Every expand and contract operation is displayed to the user and stored in the Object Database 2436.

Figure 24F:
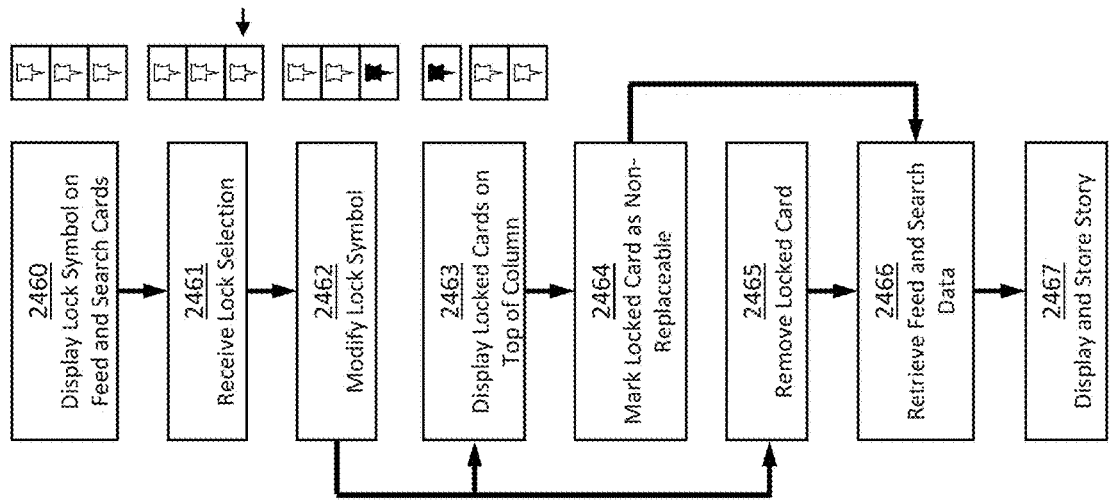
Figure 24E:
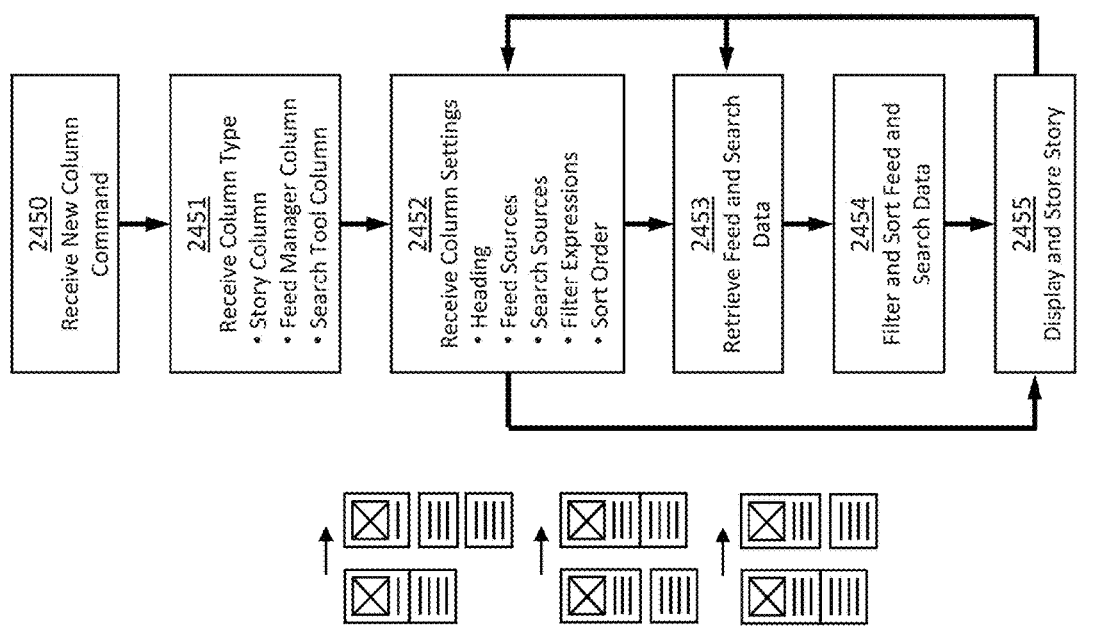
Figure 24D:
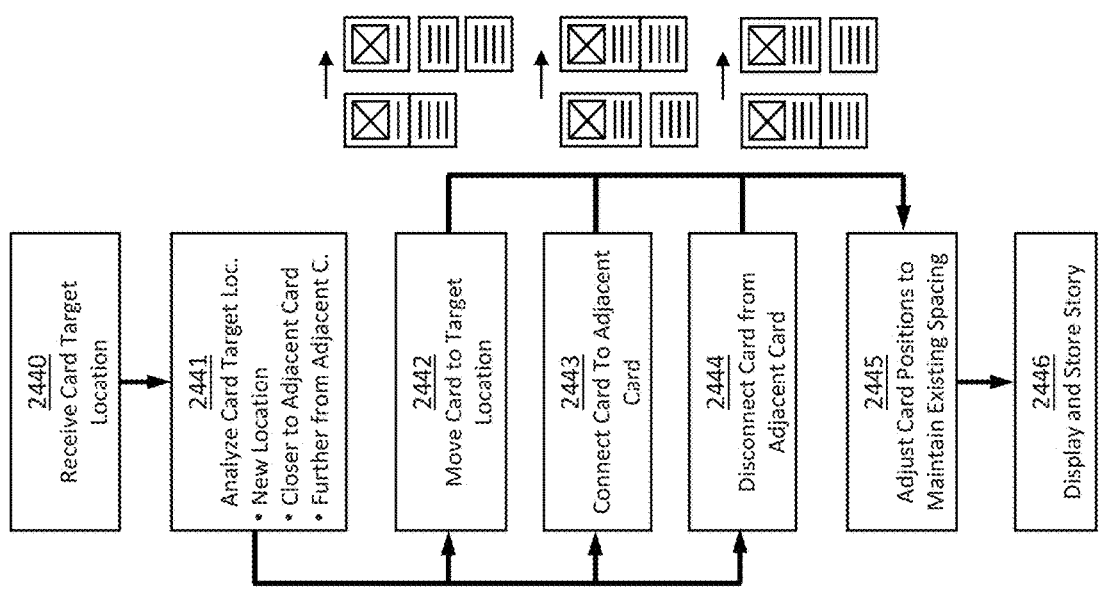

FIG. 24D shows the processes of repositioning, connecting and disconnecting Cards in accordance with an embodiment of the present invention. If a user submits a new target location for a Card 2440 then the system analyzes the target location to determine if the user intents to reposition (modified sequence of Cards), connect (reduced spatial distance to adjacent Card) or disconnect (increased spatial distance to adjacent Card) the Card 2451. A reposition command results in the system relocating the Card to the target location 2442. A connect command results in the two adjacent Cards being visually connected by means of removing the space between the two Cards (so that the content of the two Cards is perceived as a continues content) 2443. A disconnect command results in the two adjacent Cards being visually disconnected by means of creating a space between the two Cards (so that the content of the two Cards is not perceived as a continues flow of content) 2444. Following any reposition, connect and disconnect operation results in the system adjusting the spatial positions of all Cards to maintain the original spacing between Cards 2445, as well as to display and store the modifications 2446.

FIG. 24E shows the process of adding new columns to Stories in accordance with an embodiment of the present invention. If the system receives a request from the user to create a new column 2450 then the system provides the user with the option to choose a column type (Story Column, Feed Manger Column, Search Tool Column) 2451. For Feed Manger and Search Tool column the system additionally allows users to specify a column heading, sources, filters and sort preferences 2452. Sources refer to resources on the network where feed and search data is located. Filters are used to only include data that match user specified keywords. The sort preference is used to specify in what order Cards are displayed (such as by time or relevance). The system responds to a request for a new Story column by adding a new empty column to the right of existing columns. The system responds to a request for a new Feed Manager column by adding a new column to the right of existing columns and by populating the column with feed data in Card format 2453. The system responds to a request for a new Search Tool column by adding a new column to the right of existing columns and by adding a search text box at the top of the column, wherein the insertion of keywords into the search text box populates the column with search results in Card format 2453. The Cards displayed in Feed Manager and Search Tool columns are filtered and sorted 2454 as specified by the user 2452. All additions and modification are displayed and saved to the Object Database 2455.

FIG. 24F shows the process, in accordance with an embodiment of the present invention, of preventing Cards in Feed Manger and Search Tool columns to be replaced with more recent feed and search data. The system complements every Card with a function and an icon for users to disable (lock, pin) and enable (unlock, unpin) the replacement of Cards in Feed Manger and Search Tool columns 2460. User can select the icon to toggle between locking and unlocking Cards 2461. The icon changes its appearance to indicate whether a Card is locked or unlocked 2462. In addition, the system moves locked Cards to the top of the column 2463, and internally marks locked Cards as non-replaceable 2464. If a user unlocks a Card, then the Card is removed from the column and is no longer visible to the user 2465 (unless restored by subsequent feed and search updates). Locking and unlocking a Card also causes the system to adjust its search and prioritization parameters to present users with results that more closely match locked Cards 2466. Any modification to the Storyboard is displayed and saved to the Object Database 2467.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

While the invention has been particularly shown and described with reference to specific embodiments, it will be understood by those skilled in the art that various changes in form and detail may be made therein without departing from the spirit and scope of the invention as defined by the appended clauses. While some of these embodiments have been described in the claims by process steps, an apparatus comprising a computer with associated display capable of executing the process steps in the claims below is also included in the present invention. Likewise, a computer program product including computer executable instructions for executing the process steps in the claims below and stored on a computer readable medium is included within the present invention.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A computer-implemented method for creating and storing documents, the method being implemented with computer processes comprising:

receiving a first graphical user input defining content of a specific set of cards, the set including at least two members;

receiving a second graphical user input graphically connecting members of the specific set of cards so that the connected members define a distinct story as an ordered sequence of cards, the ordered sequence producing a visually continuous flow of content;

storing data corresponding to the connected members in an object database; and rendering the distinct story, as the ordered sequence of cards, to be available for display in a graphical user interface;

wherein (i) all cards in the story have a standardized structure, (ii) at least one card in the story has a user-adjustable card content separator configured so that content above the card content separator is always visible and content below the card content separator is visible only if expanded, (iii) graphical adjustment of the position of the card content separator by the user, when the story is in edit mode, determines the amount of always visible content above the card content separator and the amount of content below the card content separator, that is visible only if expanded, (iv) a third graphical user input, even when the story is not in edit mode, will expand, to make visible, content below the card content separator, (v) each card in the story is configured to accept a content type selected from the group consisting of a heading, text, a list, a picture, a video, a table, and combinations thereof, and (vi) each modification of the story is stored in the object database.

2. A computer-implemented method according to claim 1, wherein graphical adjustment, by the user, of the position of the card content separator is subject to limits that restrict the amount of always visible content above the card content separator.

3. A computer-implemented method according to claim 2, wherein the limits are adaptively established by processes responsive to content in the given card so as to avoid chopping of a content element.

4. A computer-implemented method according to claim 3, wherein the content element is selected from the group consisting of a sentence, a caption, an illustration, a table, multimedia content, and combinations thereof.

5. A computer-implemented method according to claim 1, wherein the computer processes further comprise:
  receiving a digital content input;
  scraping the digital content for at least one of a heading, a text, a paragraph, an illustration and a caption;
  converting the scraped content into a corresponding set of cards;
  positioning the card content separator in each card, in the corresponding set of cards, having a card content separator; and
  converting the corresponding set of cards into a corresponding ordered sequence of cards constituting a corresponding story.

6. A computer-implemented method according to claim 5, wherein the digital content input is selected from the group consisting of a user-selected data feed and a user-defined search and combinations thereof, and wherein the corresponding story is part of a larger story and occupies a reserved portion of a display of the larger story.

7. A computer-implemented method according to claim 5, wherein the computer processes further comprise a removal process causing older portions of the corresponding story to be removed from display so as to make room for display of more recent portions of the corresponding story.

8. A computer-implemented method according to claim 7, wherein the computer processes further comprise:
  receiving a graphical indication from a viewer to preserve, as locked, a selected card from the removal process,
  storing the graphical indication of the selected card as locked from the removal process, and
  in the removal process, excluding therefrom any card that has been thus locked.

9. A computer-implemented method according to claim 1, wherein cards in the story are configured to allow a connected card to be disconnected in a manner wherein a given set of cards can be graphically disconnected, from the set of connected members, into subsets of cards, and the resulting disconnection is visually apparent by rendering a space between disconnected cards.

10. A computer-implemented method according to claim 9, wherein cards in the story are configured so that connected cards can be graphically disconnected into columns of cards.

11. A computer-implemented method according to claim 1, wherein cards in the story are configured so that a user can copy a card of another user.

* * * * *